(12) United States Patent
Televitckiy et al.

(10) Patent No.: US 10,379,949 B2
(45) Date of Patent: Aug. 13, 2019

(54) TECHNIQUES FOR MANAGING PARITY INFORMATION FOR DATA STORED ON A STORAGE DEVICE

(71) Applicant: Apple Inc., Cupertino, CA (US)

(72) Inventors: Evgeny Televitckiy, Mountain View, CA (US); Alexander Paley, San Jose, CA (US); Andrew W. Vogan, Austin, TX (US)

(73) Assignee: Apple Inc., Cupertino, CA (US)

( * ) Notice: Subject to any disclaimer, the term of this patent is extended or adjusted under 35 U.S.C. 154(b) by 42 days.

(21) Appl. No.: 15/721,267

(22) Filed: Sep. 29, 2017

(65) Prior Publication Data

US 2019/0102253 A1 Apr. 4, 2019

(51) Int. Cl.
*G06F 11/10* (2006.01)
*G06F 3/06* (2006.01)

(52) U.S. Cl.
CPC ........ *G06F 11/1076* (2013.01); *G06F 3/0619* (2013.01); *G06F 3/0644* (2013.01); *G06F 3/0673* (2013.01)

(58) Field of Classification Search
CPC .. G06F 11/1076; G06F 3/0619; G06F 3/0644; G06F 3/0673
See application file for complete search history.

(56) References Cited

U.S. PATENT DOCUMENTS

| | | | |
|---|---|---|---|
| 8,099,624 B1 | 1/2012 | Saxena et al. | |
| 8,756,398 B2 | 6/2014 | Uhlaender | |
| 9,361,036 B2* | 6/2016 | Vogan | G06F 11/1008 |
| 9,996,285 B2* | 6/2018 | Kang | G06F 3/0619 |
| 2013/0031300 A1* | 1/2013 | Seo | G06F 12/0246 |
| | | | 711/103 |

(Continued)

FOREIGN PATENT DOCUMENTS

| | | |
|---|---|---|
| CN | 102955742 A | 3/2013 |
| WO | 2015014106 A1 | 2/2015 |

OTHER PUBLICATIONS

OpenWrt Wiki "Flash memory" (https://wiki.openwrt.org/doc/techrerf/flash) last modified Sep. 24, 2017 (4 pages).

(Continued)

*Primary Examiner* — Kyle Vallecillo
(74) *Attorney, Agent, or Firm* — Dickinson Wright RLLP

(57) ABSTRACT

Disclosed herein are techniques for managing parity information for data stored on a storage device. According to some embodiments, the method includes the steps of (1) receiving a request to store data into the storage device, (2) writing respective portions of the data into a plurality of data pages included in a first stripe of the storage device, where each data page is stored on a respective different die of the storage device, (3) calculating primary parity information for the first stripe, (4) writing the primary parity information into a primary parity page included in a second stripe of the storage device, (5) calculating secondary parity information for the second stripe, and (6) writing the secondary parity information into a secondary parity page included in a third stripe of the storage device. Additionally, a copy of the secondary parity information can be established to further-enhance redundancy.

20 Claims, 24 Drawing Sheets

(56) References Cited

U.S. PATENT DOCUMENTS

| | | | | |
|---|---|---|---|---|
| 2015/0301896 | A1* | 10/2015 | Aliev | H03M 13/15 |
| | | | | 714/6.24 |
| 2016/0306574 | A1* | 10/2016 | Friedman | G06F 3/0619 |
| 2018/0129430 | A1* | 5/2018 | Kang | G06F 3/0619 |

OTHER PUBLICATIONS

Grupp, et al. "The Bleak Future of NAND Flash Memory" University of San Diego, 2012 (8 pages).

* cited by examiner

Example Step 6 – Recover Data Page $D2_1$ from Primary Parity Page P2 and Data Pages $D2_2$, $D2_3$, $D2_4$.

Example Step 7 – Recover Data Page $D3_1$ from Primary Parity Page P3 and Data Pages $D3_2$, $D3_3$, $D3_4$.

Example Step 10 – Recover Primary Parity Page P9 using Primary Parity Page P10, Secondary Parity Page QA1 (or QB1), and Secondary Parity Page QA3 (or QB3).

Example Step 11 – All pages have been properly recovered.

Example Step 1-1 – Initial state of user band and parity band layouts.

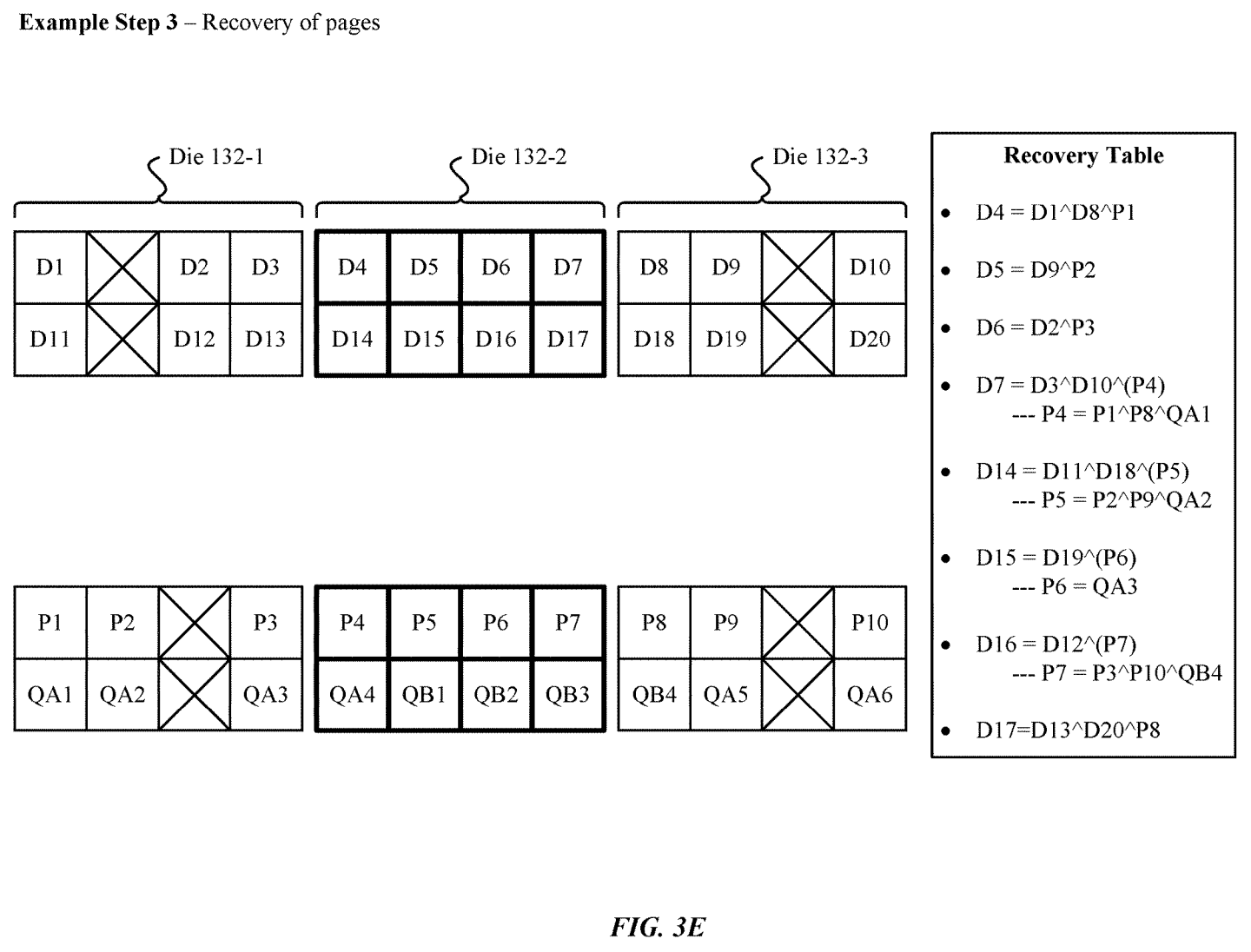

Example Step 3 – Recovery of pages

Recovery Table

- $D4 = D1 \wedge D8 \wedge P1$
- $D5 = D9 \wedge P2$
- $D6 = D2 \wedge P3$
- $D7 = D3 \wedge D10 \wedge (P4)$
  --- $P4 = P1 \wedge P8 \wedge QA1$
- $D14 = D11 \wedge D18 \wedge (P5)$
  --- $P5 = P2 \wedge P9 \wedge QA2$
- $D15 = D19 \wedge (P6)$
  --- $P6 = QA3$
- $D16 = D12 \wedge (P7)$
  --- $P7 = P3 \wedge P10 \wedge QB4$
- $D17 = D13 \wedge D20 \wedge P8$

*FIG. 3E*

Example Step 1 – Initial state of user, parity, and log band layouts.

Example Step 2 – Data Pages $D4_1$ and $D4_2$ are written in the Incomplete Stripe of the User Band until a write stop occurs.

Example Step 3 – Partial Parity Page PPF4 is calculated for the Partial Stripe, and stored into the Log Band instead of the Parity Band.

TECHNIQUES FOR MANAGING PARITY INFORMATION FOR DATA STORED ON A STORAGE DEVICE

FIELD

The described embodiments set forth techniques for establishing redundancy-based protection for data stored on a storage device. In particular, the techniques involve managing parity information for the data in a manner that enables redundancy-based protection to be established within the storage device without compromising the overall performance of the storage device.

BACKGROUND

Solid state drives (SSDs) are a type of mass storage device that share a similar footprint with (and provide similar functionality as) traditional magnetic-based hard disk drives (HDDs). Notably, standard SSDs—which utilize "flash" memory—can provide various advantages over standard HDDs, such as considerably faster Input/Output (I/O) performance. For example, average I/O latency speeds provided by SSDs typically outperform those of HDDs because the I/O latency speeds of SSDs are less-affected when data is fragmented across the memory sectors of SSDs. This occurs because HDDs include a read head component that must be relocated each time data is read/written, which produces a latency bottleneck as the average contiguity of written data is reduced over time. Moreover, when fragmentation occurs within HDDs, it becomes necessary to perform resource-expensive defragmentation operations to improve or restore performance. In contrast, SSDs, which are not bridled by read head components, can largely maintain I/O performance even as data fragmentation levels increase. SSDs also provide the benefit of increased impact tolerance (as there are no moving parts), and, in general, virtually limitless form factor potential. These advantages—combined with the increased availability of SSDs at consumer-affordable prices—make SSDs a preferable choice for mobile devices such as laptops, tablets, and smart phones.

Despite the foregoing benefits provided by SSDs, some drawbacks remain that have yet to be addressed, especially with respect to establishing redundancy-based protection within SSDs. For example, conventional techniques for implementing redundancy-based protection within a given SSD involve writing data (e.g., a user file) across different dies of the SSD, and interleaving parity information for the data within the data itself across the different dies. Unfortunately, this approach establishes a pitfall in which the data becomes unrecoverable when a single die of SSD fails, which is not uncommon. In particular, a single die failure often leads to the loss of both data and its corresponding parity data, thereby thwarting potential recovery scenarios. Notably, the conventional approaches that attempt to alleviate this problem typically come at the cost of significant performance/flexibility reduction and increased storage space consumption, which is undesirable for obvious reasons. Therefore, there exists a need for a technique for improving the overall redundancy-based protection characteristics of a given SSD without requiring significant performance and storage space sacrifices.

SUMMARY

The described embodiments set forth techniques for managing parity information for data stored on a storage device to provide improved redundancy-based protection characteristics without sacrificing the overall performance of the storage device.

One embodiment sets forth a method for managing parity information for data stored on a storage device. According to some embodiments, the method includes the steps of (1) receiving a request to store data into the storage device, (2) writing respective portions of the data into a plurality of data pages included in a first stripe of the storage device, wherein each data page is stored on a respective different die of the storage device, (3) calculating primary parity information for the first stripe, (4) writing the primary parity information into a primary parity page included in a second stripe of the storage device, (5) calculating secondary parity information for the second stripe, and (6) writing the secondary parity information into a secondary parity page included in a third stripe of the storage device. The method can further include the steps of (7) writing a copy of the secondary parity page into a different secondary parity page included in the third stripe, wherein the different secondary parity page is stored on a different die than the respective die on which the secondary parity page is stored. According to some embodiments, the first stripe can be logically disposed within a first band of the storage device, while the second stripe can be logically disposed within a second band of the storage device, such that the parity information is not interleaved with the data to which the parity information corresponds.

Another embodiment sets forth a method for managing partial parity information for data stored on a storage device. According to some embodiments, the method includes the steps of (1) receiving a request to store data into the storage device, (2) writing respective portions of the data into a plurality of data pages included in a first stripe of the storage device, wherein each data page is stored on a respective different die of the storage device, (3) identifying that at least one data page of the plurality of data pages is incomplete, (4) calculating partial parity information for the first stripe, (5) writing the partial parity information into a first partial parity page included in a second stripe of the storage device, and (6) writing a copy of the partial parity information into a second partial parity page included in the second stripe of the storage device. In turn, the method can further include the steps of (7) receiving an indication of an invalidation of the partial parity information, (8) calculating primary parity information for the first stripe in accordance with the first partial parity page or the second partial parity page, and (9) writing the primary parity information into at least one parity page included in a third stripe.

Other embodiments include a non-transitory computer readable storage medium configured to store instructions that, when executed by a processor included in a computing device, cause the computing device to carry out the various steps of any of the foregoing methods. Further embodiments include a computing device that is configured to carry out the various steps of any of the foregoing methods.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing wireless computing devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

FIGS. 2A-2K illustrate conceptual diagrams of an example scenario in which a procedure is carried out to restore user data when a failure of a die occurs within a non-volatile memory of a storage device, according to some embodiments.

FIGS. 3A-3E illustrate conceptual diagrams of an example scenario in which a procedure is carried out to restore user data when different pages are disparately written across dies of a non-volatile memory of a storage device, according to some embodiments.

DETAILED DESCRIPTION

Figure 1:
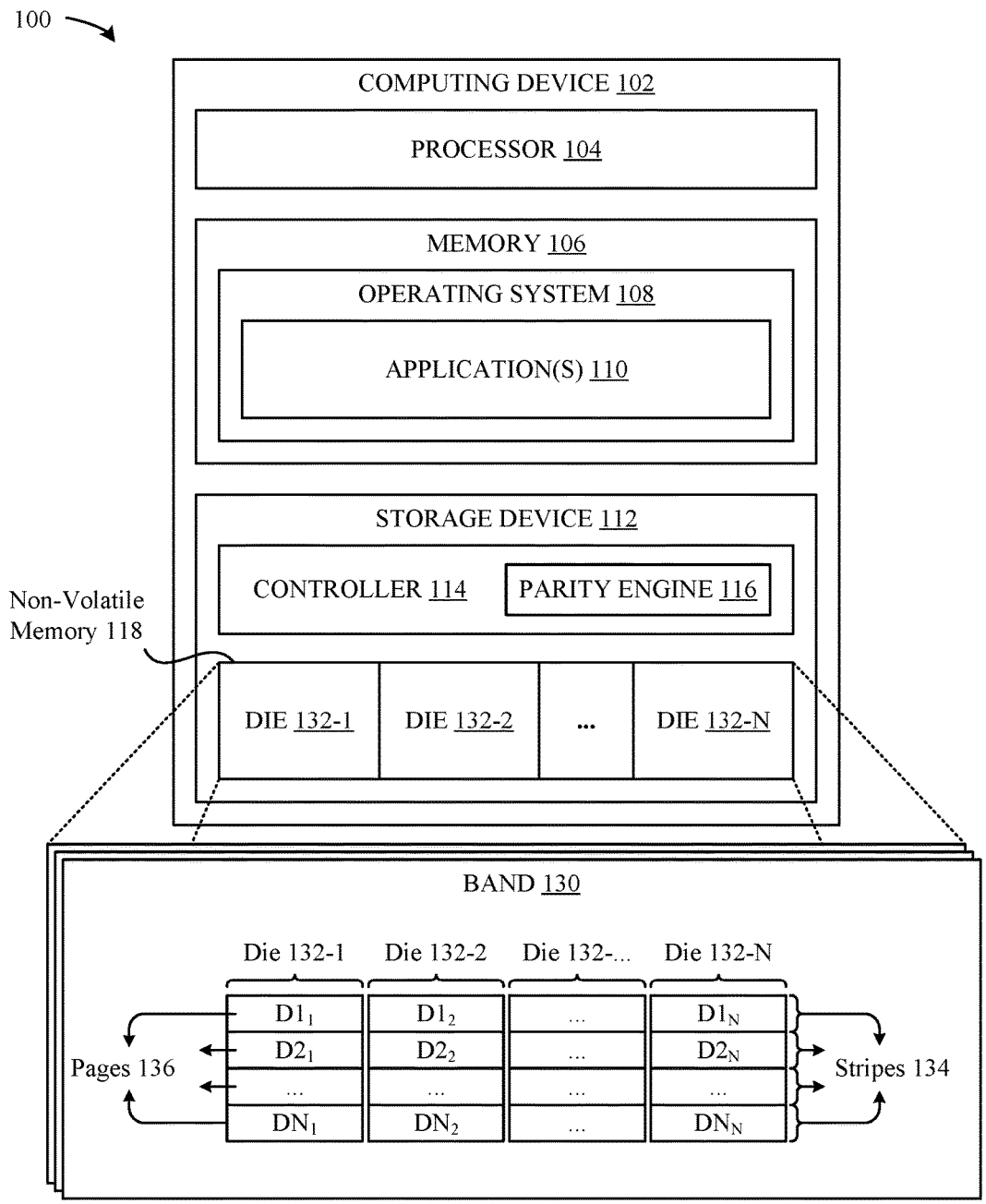
FIG. 1 illustrates a block diagram of different components of a system that is configured to implement the various techniques described herein, according to some embodiments.

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

The embodiments described herein set forth techniques for managing parity information for data stored on a storage device to implement redundancy-based protection. According to some embodiments, the techniques can involve establishing different "bands" that span different dies of the storage device. In particular, each band can be horizontally separated into different "stripes". Moreover, each stripe can be vertically separated into different "pages," such that each page of a given stripe is disposed on a different one of the dies. In accordance with this approach, a data object (e.g., a user file) can be written across one or more pages/stripes of a first band (e.g., a "user band") of the storage device. To establish redundancy-based protection for the data object, the techniques can involve writing primary parity information for the data object across one or more pages/stripes of a second band (e.g., a "parity band") of the storage device.

Additionally, the techniques can involve establishing redundancy-based protection for the primary parity information by writing, within the parity band, secondary parity information for the primary parity information. To establish redundancy-based protection for the secondary parity information, the techniques can further involve establishing a copy of the secondary parity information within the parity band, where the copy of the secondary parity information is stored on a different die relative to the die on which the second party information is stored. Accordingly, given the first band the second band are distinct from one another, the primary/secondary parity information is not interleaved with the data itself. In this manner, an "out-of-band" paradigm is established with regard to the placement of the parity information (relative to the data to which the parity information corresponds), which can result in improved redundancy-based protection characteristics without sacrificing the overall performance of the storage device.

Additionally, the techniques set forth herein can be applied in scenarios where pages are not contiguously written within one or more stripes. This can occur, for example, when "step-over" conditions take place as a result of different areas of the storage device not being accessible (e.g., bad blocks, inaccessible dies, etc.). Moreover, the techniques set forth herein can be adapted to account for partially-written stripes that result from a variety of conditions (e.g., inadvertent shutdowns). In particular, the techniques can involve storing partial parity information (in lieu of complete parity information) within a third band (e.g., a "log band") that stores both log-based information and partial parity information. In this manner, the partial parity information can be recalled/invalidated in a lightweight manner when appropriate (e.g., during a reboot), thereby improving the overall efficiency of the techniques described herein.

A more detailed discussion of these techniques is set forth below and described in conjunction with FIGS. 1, 2A-2L, 3A-3E, 4A-4E, and 5, which illustrate detailed diagrams of systems and methods that can be used to implement these techniques.

FIG. 1 illustrates a block diagram 100 of a computing device 102—e.g., a smart phone, a tablet, a laptop, a desktop, a server, etc.—that is configured implement the various techniques described herein. As shown in FIG. 1, the computing device 102 can include a processor 104 that, in conjunction with a memory 106 (e.g., a dynamic random access memory (DRAM)) and a storage device 112 (e.g., a solid-state drive (SSD)), enables different software entities to execute on the computing device 102. For example, the processor 104 can be configured to load, from the storage device 112 into the memory 106, various components for an operating system (OS) 108. In turn, the OS 108 can enable the computing device 102 to provide a variety of useful functions, e.g., loading/executing various applications 110 (e.g., user applications). It should be understood that the computing device 102 illustrated in FIG. 1 is presented at a high level in the interest of simplification, and that a more detailed breakdown is provided below in conjunction with FIG. 5.

According to some embodiments, and as shown in FIG. 1, the storage device 112 can include a controller 114 that is configured to orchestrate the overall operation of the storage device 112. For example, the controller 114 can be configured to receive and process input/output (I/O) requests issued by the OS 108/applications 110 to the storage device 112. According to some embodiments, the controller 114 can include a parity engine 116 that enables the controller 114 to establish the various parity information (e.g., for user data) described herein. It is noted that the controller 114 can include additional entities that enable the implementation of the various techniques described herein. Is further noted that these entities can be combined or split into additional entities without departing from the scope of this disclosure. It is additionally noted that the various entities described herein can be implemented using software-based or hardware based approaches.

In any case, as shown in FIG. 1, the storage device 112 can include a non-volatile memory 118 (e.g., flash memory) that is composed of a collection of dies 132. According to some embodiments, and as shown in FIG. 1, a collection of bands 130 can be established within the non-volatile memory 118, where each band 130 spans the collection of dies 132. It is noted that one or more of the dies 132 can be reserved by the storage device 112—e.g., for overprovisioning-based techniques—without departing from the scope of this disclosure, such that a given band 130 can span a subset of the dies 132 that are available within the non-volatile memory 118. In this regard, the overall "width" of the band 130 is defined by the number of dies 132 that the band 130 spans. Continuing with this notion, the overall "height" of the band 130 is defined by a number of stripes 134 into which the band 130 is separated. According to some embodiments, and as shown in FIG. 1, each stripe 134 within the band 130 can be separated into a collection of pages 136 ($DN_M$), where each page 136 is disposed on a different die 132 of the non-volatile memory 118. In this regard, when the band 130 spans five different dies 132—and is composed of five different stripes 134—a total of twenty-five (25) pages 136 are included in the band 130, where each column of pages 136 is disposed on the same die 132. As described in greater detail herein, this organization enables user data and parity data to be separated across the non-volatile memory 118 in a manner that enables redundancy-based protection to be established without significantly impacting the overall performance of the storage device 112.

Accordingly, FIG. 1 provides high-level overview of the manner in which the computing device 102 can be configured to implement the techniques described herein. A more detailed explanation of these techniques will now be provided below in conjunction with FIGS. 2A-2L, 3A-3E, 4A-4E, and 5.

Figure 2A:
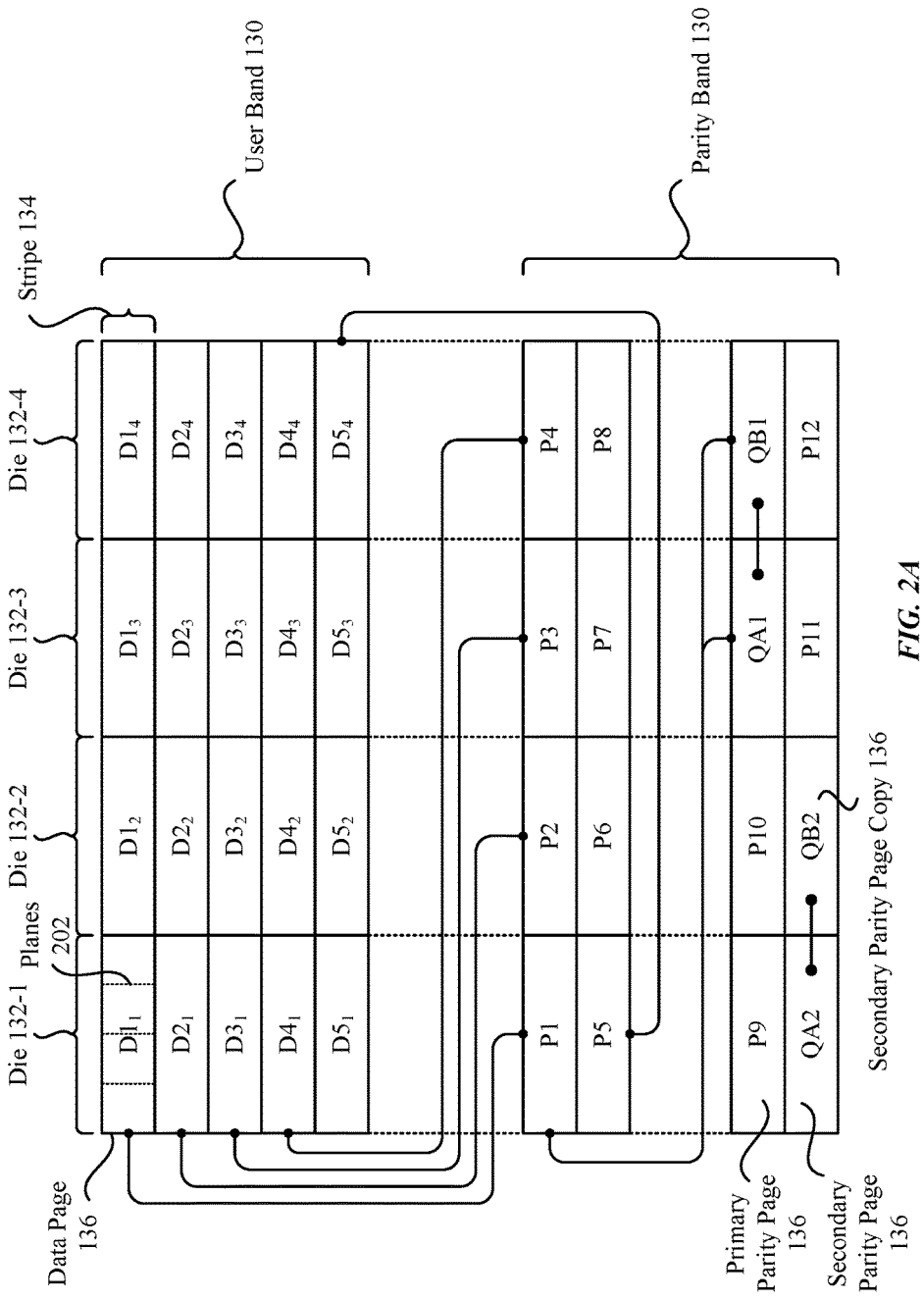

FIGS. 2A-2K illustrate conceptual diagrams of an example scenario in which a procedure is carried out to restore user data when a failure of a die 132 occurs within the non-volatile memory 118 of the storage device 112, according to some embodiments. As shown in FIG. 2A, a first step provides an example architectural layout of the non-volatile memory 118 to provide foundational support for the various techniques that are described in conjunction with FIGS. 2B-2K. In particular, the non-volatile memory 118 includes four dies 132: a die 132-1, a die 132-2, a die 132-3, and a die 132-4. Moreover, the non-volatile memory 118 is separated into two different bands 130: a user band 130, and a parity band 130, where the user band 130 includes five stripes 134, and the parity band 130 includes four stripes 134. For example, each stripe 134 of the user band 130 can include four different data pages 136 (e.g., $DN_1$, $DN_2$, $DN_3$, and $DN_4$, where N is the stripe number, and $1 \leq N \leq 5$), such that each data page 136 is stored on a respective different die 132 of the non-volatile memory 118. Notably—and as illustrated within the data page 136 "$D1_1$" in FIG. 2A—each data page 136 can encompass four different planes 202, at least within the context of FIGS. 2A-2K. It is noted that this number of planes 202 is merely exemplary, and that each data page 136 can be separated into any number of planes 202 without departing from the scope of this disclosure.

In any case, as shown in FIG. 2A, each stripe 134 of the parity band 130 can include a combination of primary parity pages 136 (e.g., P1, P2, . . . , P12) and secondary parity pages 136 (e.g., QA1, QB1, QA2, and QB2). As described in greater detail herein, a primary parity page 136 refers to parity information that directly corresponds to data pages 136, whereas a secondary parity page 136 refers to parity information that directly corresponds to primary parity pages 136.

As shown in FIG. 2A, each primary parity page 136 included in the parity band 130 can correspond to a respective stripe 134 of the user band 130. For example, the primary parity page 136 "P1" can correspond to the first stripe 134 of the user band 130, where the primary parity page 136 "P1" stores parity information that represents a parity calculation between each of the data pages 136 "$D1_1$", "$D1_2$", "$D1_3$", "$D1_4$", and "$D1_5$". In particular, the primary parity page 136 "P1" can represent a calculation of an exclusive disjunction (XOR) across each of the data pages 136 of the first stripe 134 of the user band 130. For example, when (1) the data page 136 "$D1_1$" has a value of "1111", (2) the data page 136 "$D1_2$" has a value of "1110", (3) the data page 136 "$D1_3$" has a value of (1100), (4) the data page 136 "$D1_4$" has a value of (1000), and (5) the data page 136 "$D1_5$" has a value of (0000), the XOR of these data pages 136 can be calculated as follows:

$$1111 \; XOR \; 1110 \; XOR \; 1100 \; XOR \; 1000 \; XOR \; 0000 =$$
$$(((1111 \; XOR \; 1110) \; XOR \; 1100) \; XOR \; 1000) \; XOR \; 0000 =$$
$$((0001 \; XOR \; 1100) \; XOR \; 1000) \; XOR \; 0000 =$$
$$(1101 \; XOR \; 1000) \; XOR \; 0000 = 0101 \; XOR \; 0000 = 0101.$$

It is noted that the foregoing parity calculation is exemplary and that any form of parity calculation can be implemented without departing from the scope of this disclosure. In any case, returning now to FIG. 2A, it is noted that each secondary parity page 136 included in the parity band 130 can correspond to a respective stripe 134 of the parity band 130 that includes primary parity pages 136. For example, the secondary parity page 136 "QA1" can correspond to the first stripe 134 of the parity band 130, where the secondary parity page 136 "QA1" stores parity information that represents a parity calculation between each of the primary parity pages 136 "P1", "P2", "P3", and "P4". In particular, the secondary parity page 136 "QA1" can represent a calculation of an exclusive disjunction (XOR) across each of the primary parity pages 136 of the first stripe 134 of the parity band 130. Additionally, as shown in FIG. 2A, there exists a copy for each secondary parity page 136 stored in parity band 130. For example, for the secondary parity page 136 "QA1", there exists a secondary parity page 136 "QB1" that is a copy of the secondary parity page 136 "QA1". In another example, for the secondary parity page 136 "QA2", there exists a secondary parity page 136 "QB2" that is a copy of the secondary parity page 136 "QA2". As described in greater detail below, the copies of the secondary parity pages 136 enable recovery procedures to be carried out even when a total failure of an individual die 132 occurs, thereby providing robust recovery performance.

Accordingly, FIG. 2A sets forth an example architectural layout of the non-volatile memory 118 to provide foundational support for the various techniques that are described in conjunction with FIGS. 2B-2K. It is noted that the breakdown of the non-volatile memory 118 illustrated in FIG. 2A is merely exemplary, and does not, in any manner, represent any limitations associated with the embodiments described herein. On the contrary, the non-volatile memory 118 can include any number of dies 132, bands 130, stripes 134, etc., without departing from the scope of this disclosure. In any case, FIGS. 2B-2K continue the example scenario illustrated in FIG. 2A, and involve performing a recovery procedure in response to a complete failure of the first die 132-1, which will now be described below in greater detail.

Figure 2B:
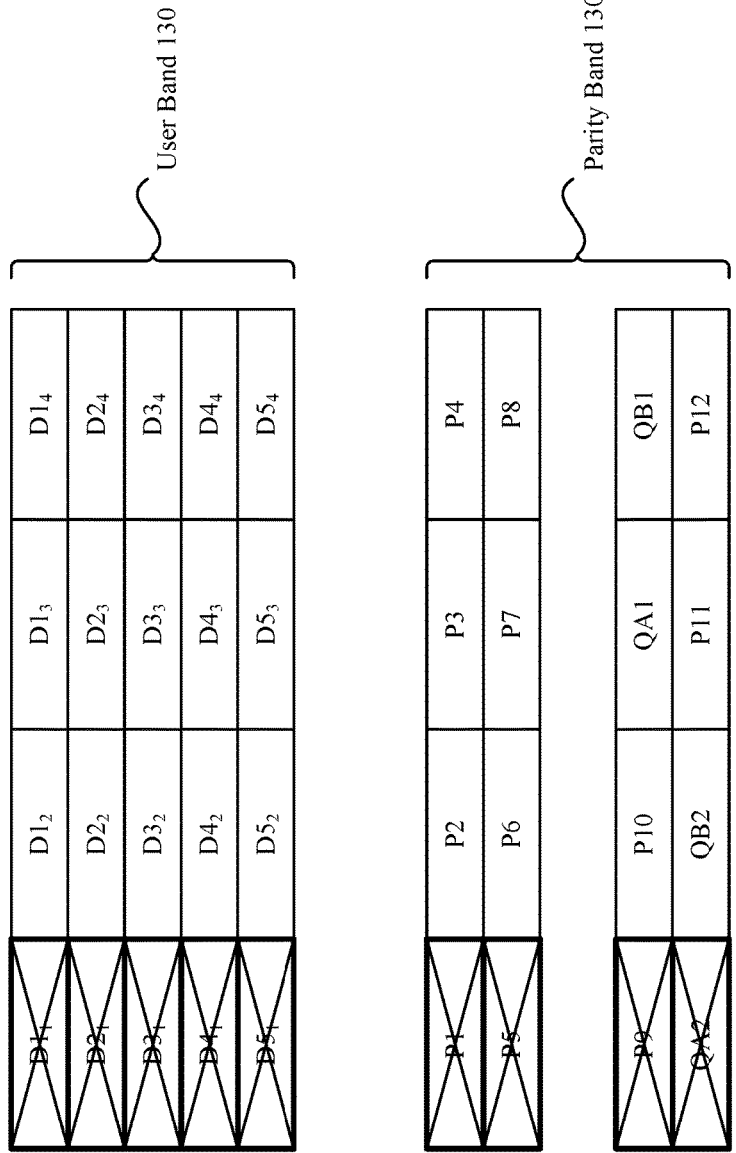

As shown in FIG. 2B, and as noted above, a second step involves a total failure of the die 132-1 within the non-volatile memory 118. This can occur, for example, due to aging components, physical damage, heat, and so on. In any case, as shown in FIG. 2B, the failure of the die 132-1 results in the loss of the first data page 136 of each stripe 134 in the user band 130 (i.e., $D1_1$, $D2_1$, $D3_1$, $D4_1$, and $D5_1$). Moreover, the failure of the die 132-1 results in the loss of the first primary parity page 136 of the first three stripes 134 in the parity band 130 (i.e., P1, P5, and P9). Additionally, the failure of the die 132-1 results in the loss of the secondary parity page 136 of the last stripe 134 in the parity band 130 (i.e., QA2). At this juncture, it is desirable to carry out a recovery procedure in which the first data page 136 of each stripe 134 in the user band 130 (i.e., $D1_1$, $D2_1$, $D3_1$, $D4_1$, and $D5_1$) can be recovered so that no user data is lost. Fortunately, the parity band 130—specifically, the manner in which the primary parity information/secondary parity information is laid out within the parity band 130—enables such a recovery procedure to be carried out, which will now be described below in greater detail.

Notably, to properly recover each of the data pages 136 (i.e., $D1_1$, $D2_1$, $D3_1$, $D4_1$, and $D5_1$), each of the primary parity pages 136 (i.e., P1, P2, P3, P4, and P5) should be intact. However, as noted above, the primary parity pages 136 "P1" and "P5" are no longer available as a consequence of the failure of the die 132-1. Accordingly, a first portion of the recovery process can involve recovering the primary parity pages 136 "P1" and "P5" using the secondary parity information, which is described below in greater detail in conjunction with FIGS. 2C-2D. It is noted that this recovery process can be carried out in response to a variety of conditions being met, e.g., in response to detecting a failure of the die 132-1, in response to receiving a request to access any of the inaccessible data pages 136 ($D1_1$, $D2_1$, $D3_1$, $D4_1$, and $D5_1$), and so on.

Figure 2C:
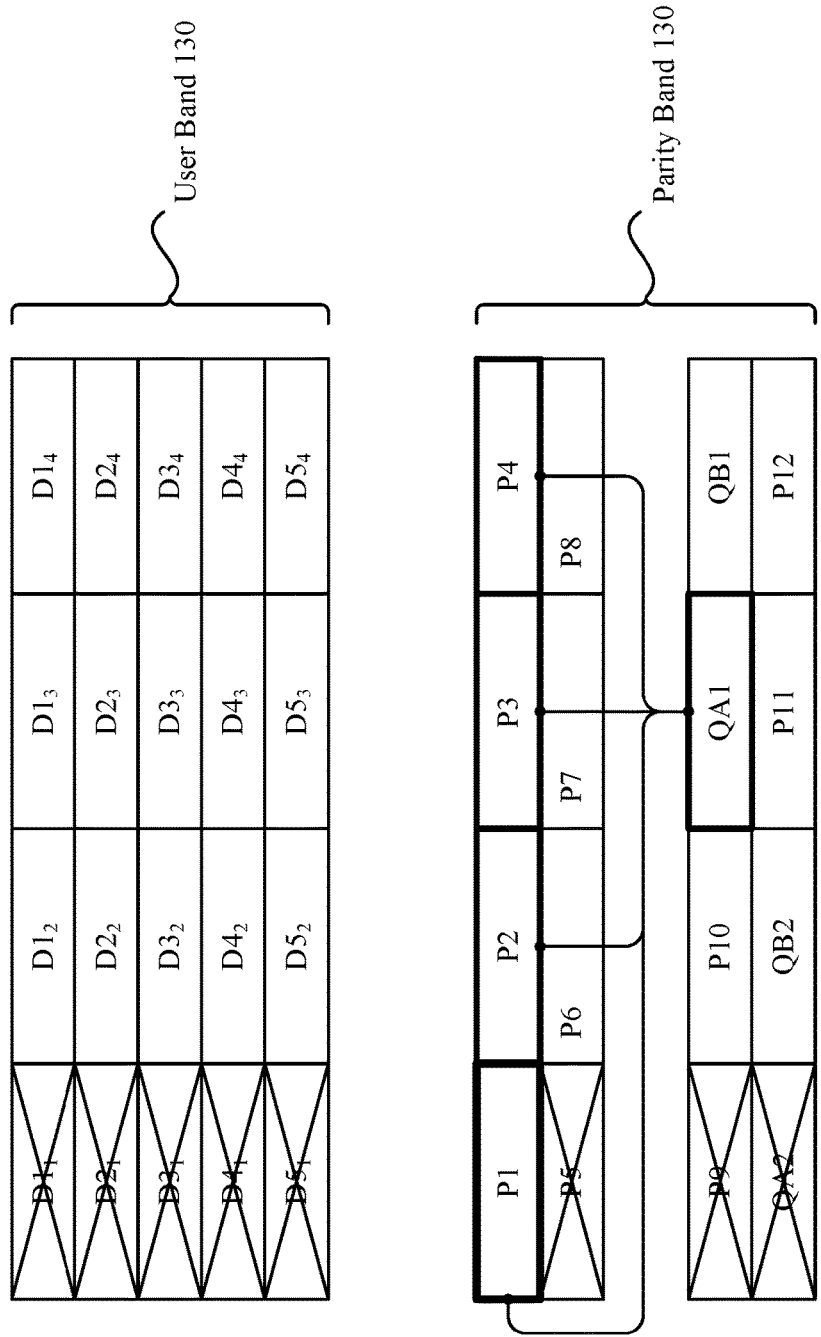

Accordingly, a third step in FIG. 2C involves recovering the primary parity page 136 "P1". As previously set forth herein, the secondary parity page 136 "QA1" represents the exclusive disjunction (XOR) of the primary parity pages 136 "P1", "P2", "P3", and "P4". In this regard, even though the primary parity page 136 "P1" is unavailable (due to the failure of the die 132-1), the primary parity page 136 "P1" can nonetheless be recovered using (1) the secondary parity page 136 "QA1", and (2) the primary parity pages 136 "P2", "P3", and "P4". This notion is illustrated in FIG. 2C by way of the directional arrows, which indicate that the combination of the aforementioned primary/secondary parity pages 136 can be utilized to recover the primary parity page 136 "P1". It is noted that the recovered primary parity page 136 "P1" is illustrated within the same position for the purpose of simplicity, and that those having skill in the art will appreciate that the recovered primary parity page 136 "P1" will be stored in another location (as the die 132-1 is not functional). In any case, with the primary parity page 136 "P1" recovered, the recovery procedure can advance to a following step that involves recovering the primary parity page 136 "P5", which is described below in greater detail.

Figure 2D:
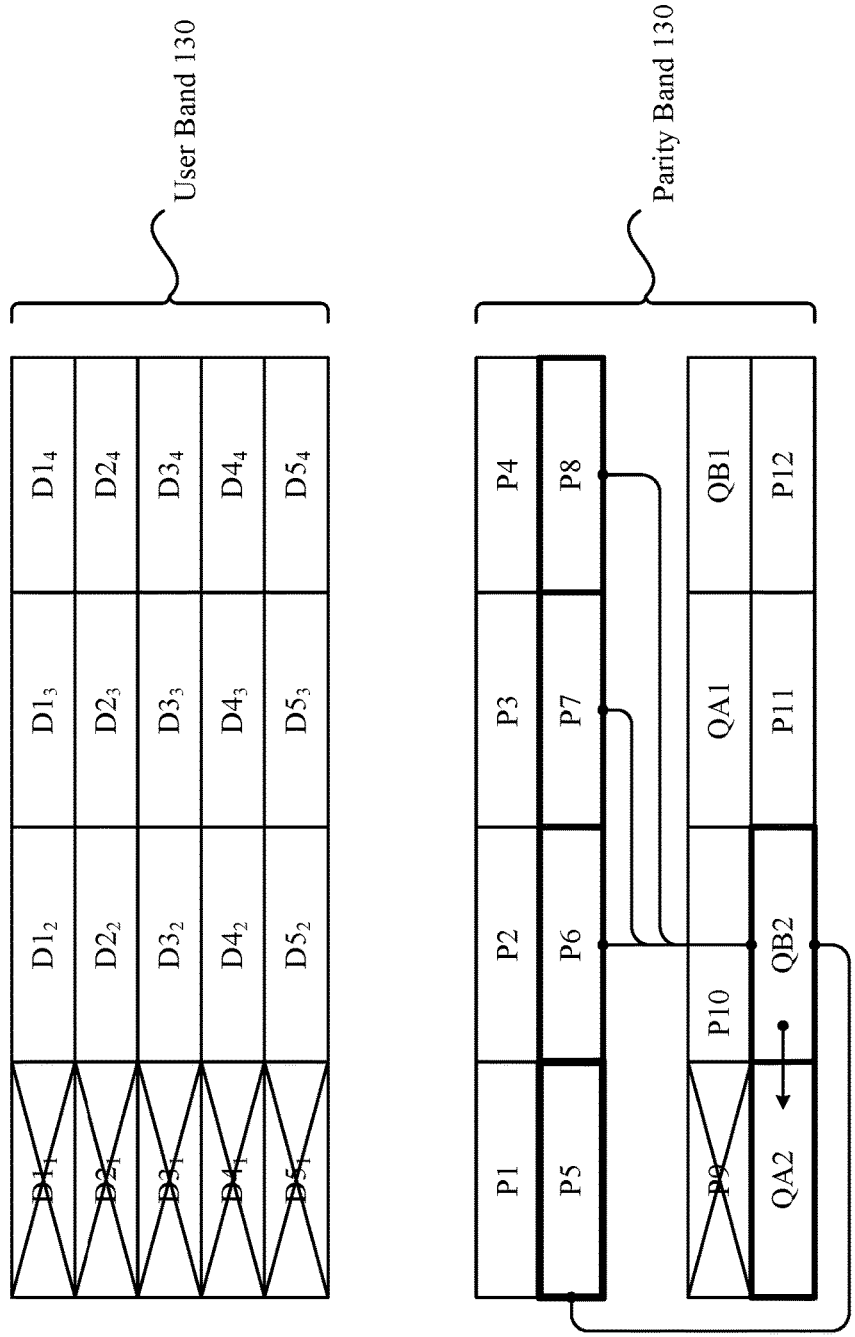

Turning now to FIG. 2D, a fourth step involves recovering the primary parity page 136 "P5". In particular, and as previously noted herein, the secondary parity page 136 "QA2" represents the exclusive disjunction (XOR) of the primary parity pages 136 "P5", "P6", "P7", and "P8". In this regard, even though the primary parity page 136 "P5" is unavailable (due to the failure of the die 132-1), the primary parity page 136 "P5" can nonetheless be recovered using (1) the secondary parity page 136 "QA2", and (2) the primary parity pages 136 "P6", "P7", and "P8". Unfortunately, the secondary parity page 136 "QA2" is not available (due to the failure of the die 132-1), and therefore cannot be used to recover the primary parity page 136 "P5". However, as previously described herein, there exists a copy for each secondary parity page 136, where the copy resides on a die 132 that is distinct from the die 132 on which the secondary parity page 136 resides. In particular, there exists a copy "QB2" of the secondary parity page 136 "QA2" on the die 132-2. In this regard, the secondary parity page 136 "QA2" can be recovered directly from the secondary parity page 136 "QB2". In turn, the recovered secondary parity page 136 "QA2" can be used to recover the primary parity page 136 "P5", the notion of which is illustrated in FIG. 2D by way of the directional arrows. It is noted that either of the secondary parity page 136 "QA2"/"QB2" can be used when performing this recovery procedure without departing from the scope of this disclosure. In any case, it is noted that the recovered primary parity page 136 "P5" is illustrated within the same position for the purpose of simplicity, and that those having skill in the art will appreciate that the recovered primary parity page 136 "P5" will be stored in another location (as the die 132-1 is not functional). In any case, with the primary parity page 136 "P5" recovered, the recovery procedure can advance to subsequent steps that involve recovering each of the data pages 136 ($D1_1$, $D2_1$, $D3_1$, $D4_1$, and $D5_1$), which is described below in greater detail.

Figure 2E:
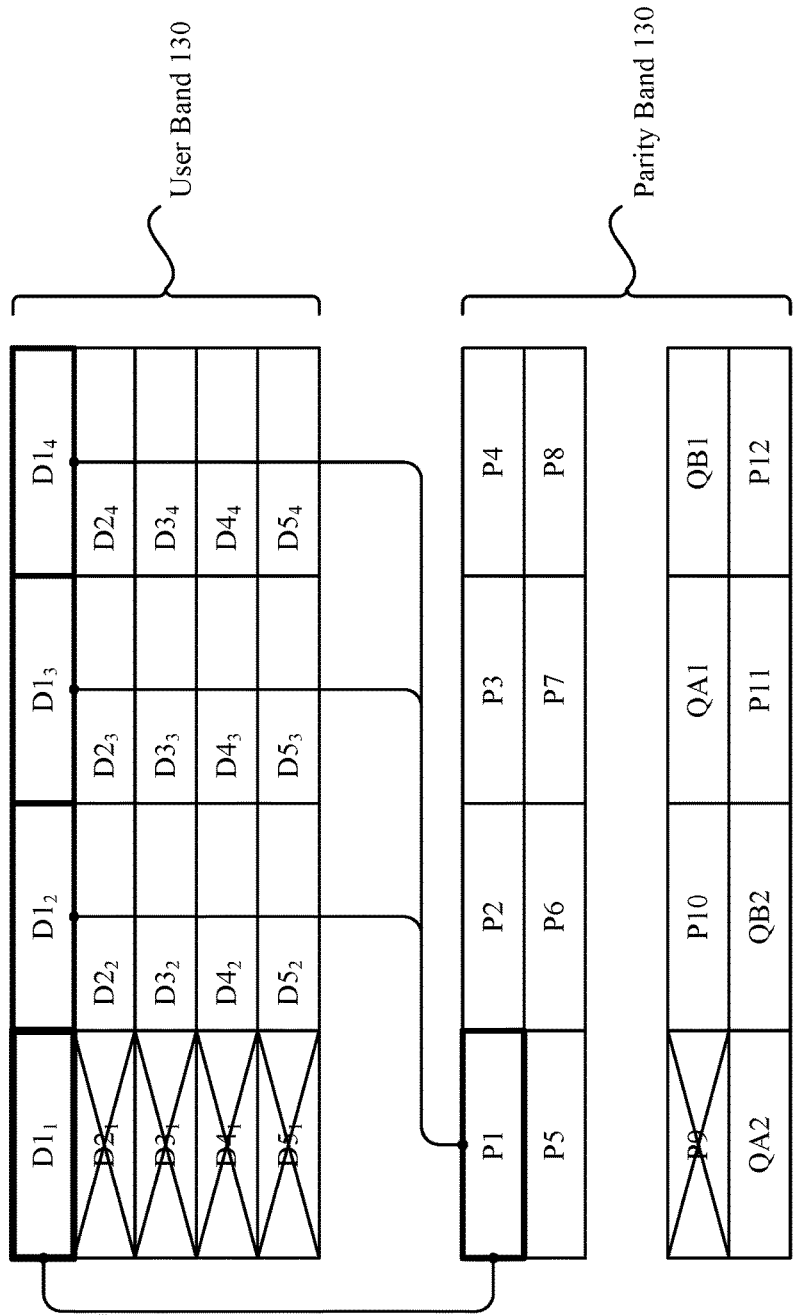
Figure 2F:
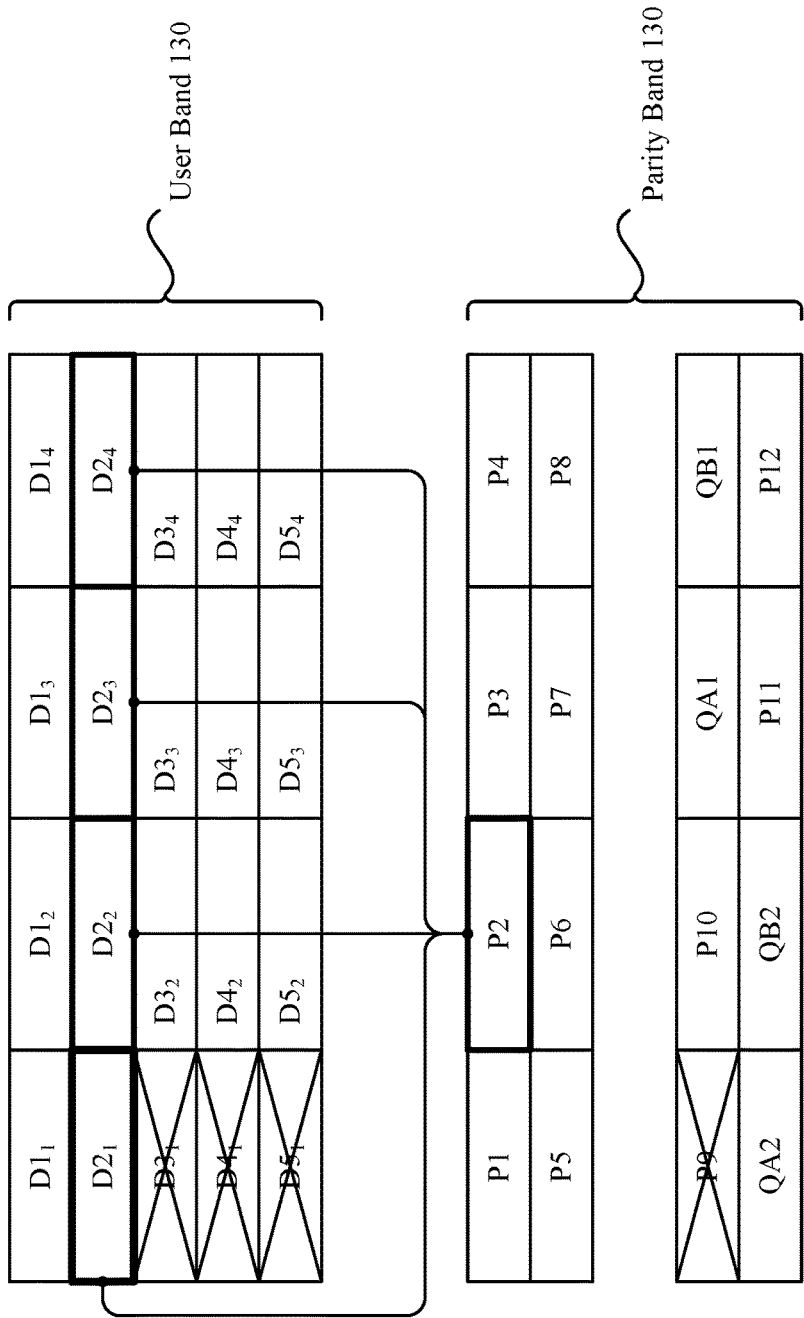
Figure 2G:
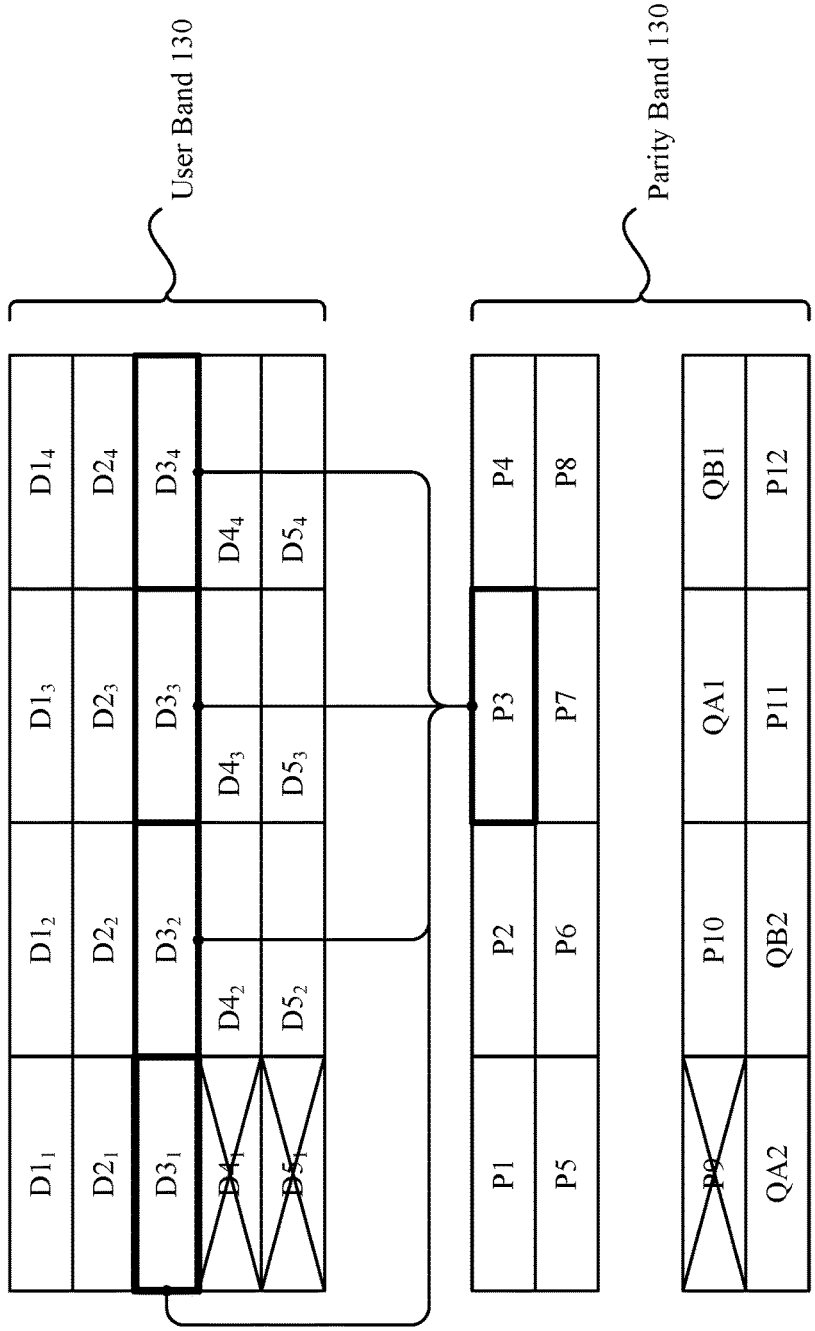
Figure 2H:
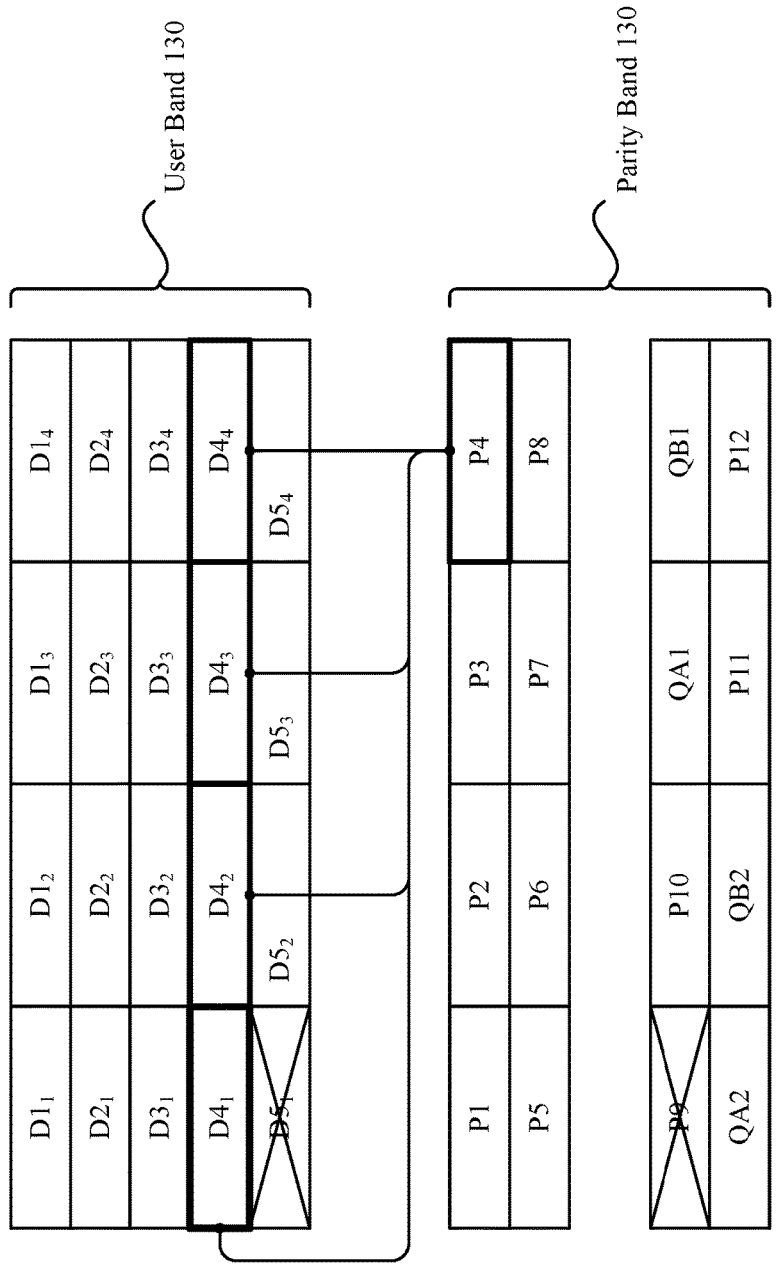
Figure 21:
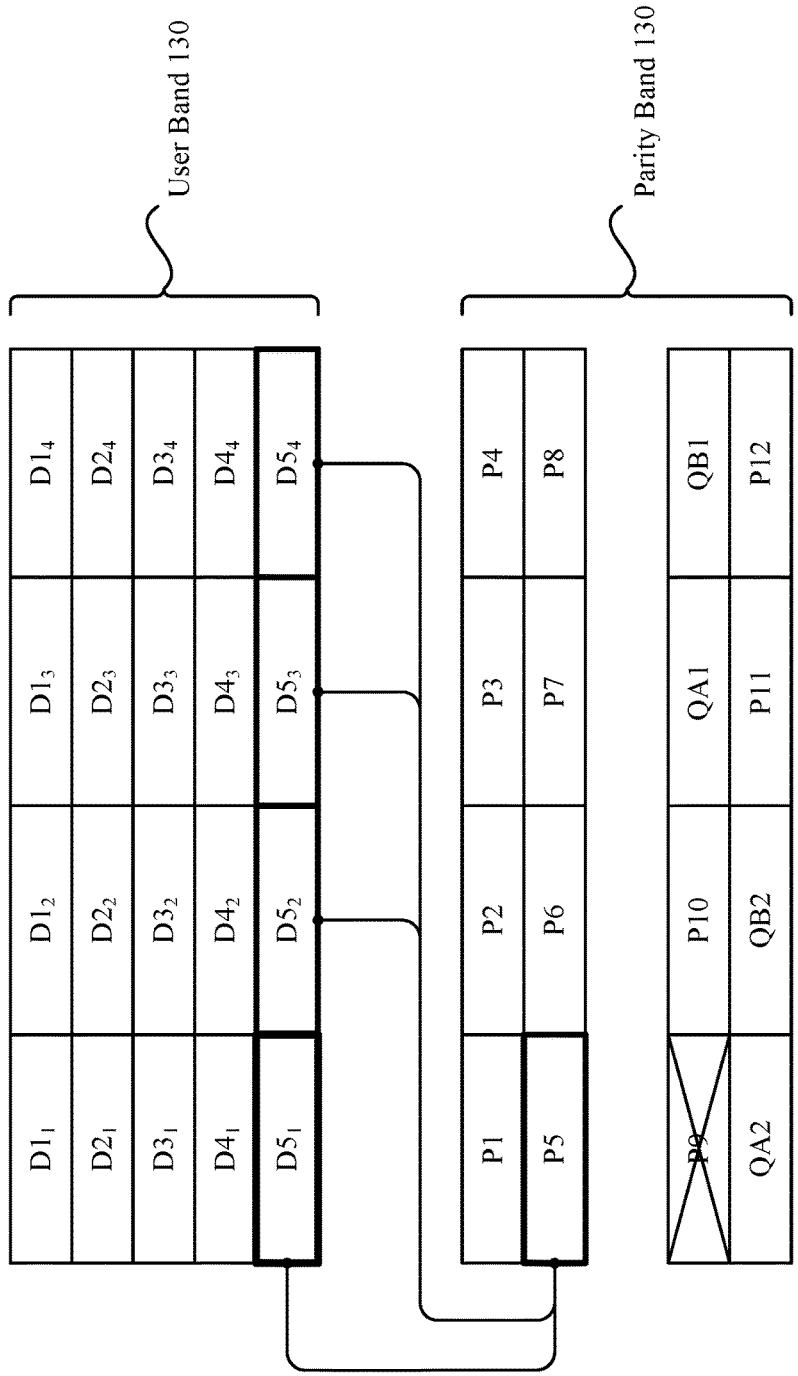

Turning now to FIG. 2E, a fifth step involves recovering the data page 136 "$D1_1$" included in the first stripe 134 of the user band 130. In particular, and as previously noted herein, the primary parity page 136 "P1" represents the exclusive disjunction (XOR) of the data pages 136 ($D1_1$, $D1_2$, $D1_3$, and $D1_4$). In this regard, even though the data page 136 "$D1_1$" is unavailable (due to the failure of the die 132-1), the data page 136 "$D1_1$" can nonetheless be recovered using (1) the (recovered) primary parity page 136 "P1", and (2) the data pages 136 ($D1_2$, $D1_3$, and $D1_4$). This notion is illustrated in FIG. 2E by way of the directional arrows, which indicate that the combination of the aforementioned data/primary parity pages 136 can be utilized to recover the data page 136 "$D1_1$". It is noted that the recovered data page 136 "$D1_1$" is illustrated within the same position for the purpose of simplicity, and that those having skill in the art will appreciate that the recovered data page 136 "$D1_1$" will be stored in another location (as the die 132-1 is not functional). In any case, with the data page 136 "$D1_1$" recovered, the recovery procedure can advance to additional sixth (FIG. 2F), seventh (FIG. 2G), eighth (FIG. 2H), and ninth (FIG. 2I) steps that involve recovering the data pages 136 ($D2_1$, $D3_1$, $D4_1$, and $D5_1$) using the appropriate corresponding data pages 136/primary parity pages 136.

Figure 2J:
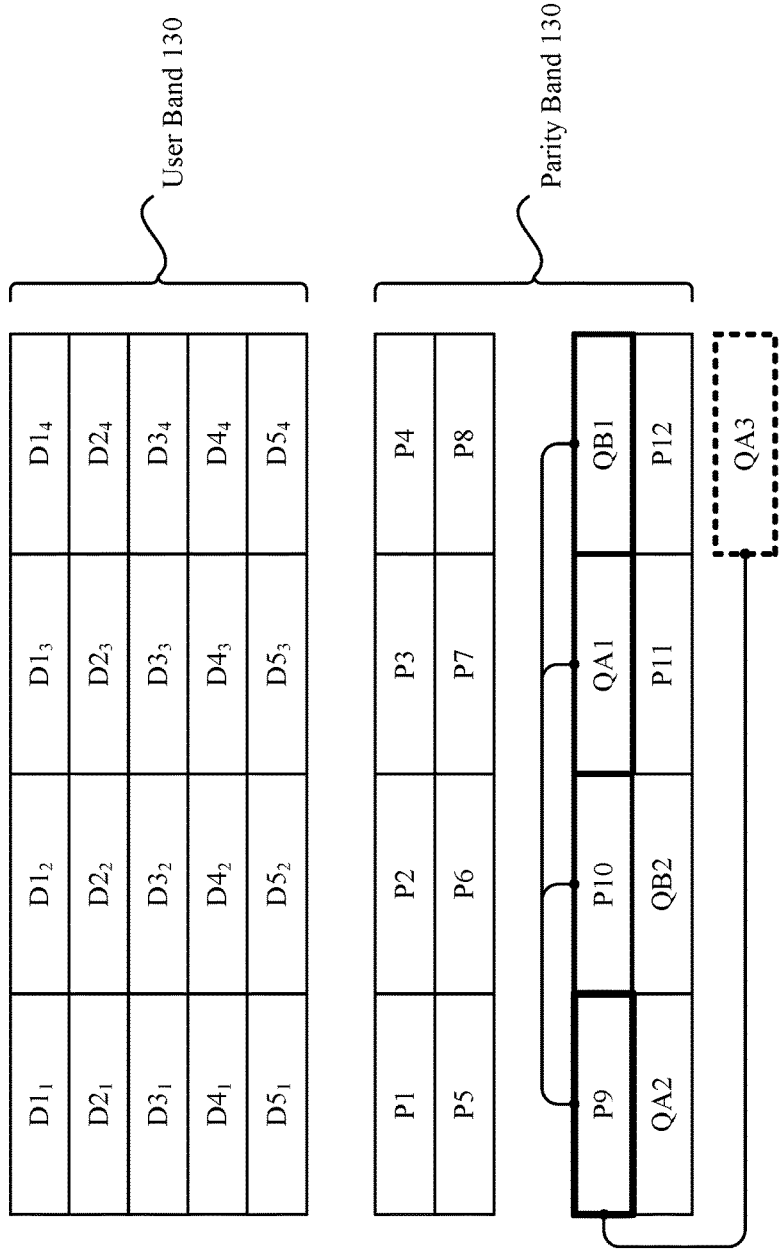

Accordingly, at the conclusion of the ninth step of FIG. 2I, each of the data pages 136 "$D1_1$", "$D2_1$", "$D3_1$", "$D4_1$", and "$D5_1$", have been effectively restored. At this juncture, additional steps can be taken to recover additional lost pages 136, including the primary parity page 136 "P9". In particular, a tenth step in FIG. 2J involves recovering the primary parity page 136 "P9", where the secondary parity page 136 "QA3" represents the exclusive disjunction (XOR) of (1) the primary parity pages 136 (P9, P10), and (2) the secondary parity pages 136 (QA1, QB1). In this regard, even though the primary parity page 136 "P9" is unavailable (due to the failure of the die 132-1), the primary parity page 136 "P9" can nonetheless be recovered using (1) the secondary parity page 136 "QA3", (2) the primary parity page 136 "P10", and (3) the secondary parity pages 136 (QA1, QB1). This notion is illustrated in FIG. 2J by way of the directional arrows, which indicate that the combination of the aforementioned primary/secondary parity pages 136 can be utilized to recover the primary parity page 136 "P9". Again, it is noted that the recovered primary parity page 136 "P9" is illustrated within the same position for the purpose of simplicity, and that those having skill in the art will appreciate that the recovered primary parity page 136 "P9" will be stored in another location (as the die 132-1 is not functional).

Figure 2K:
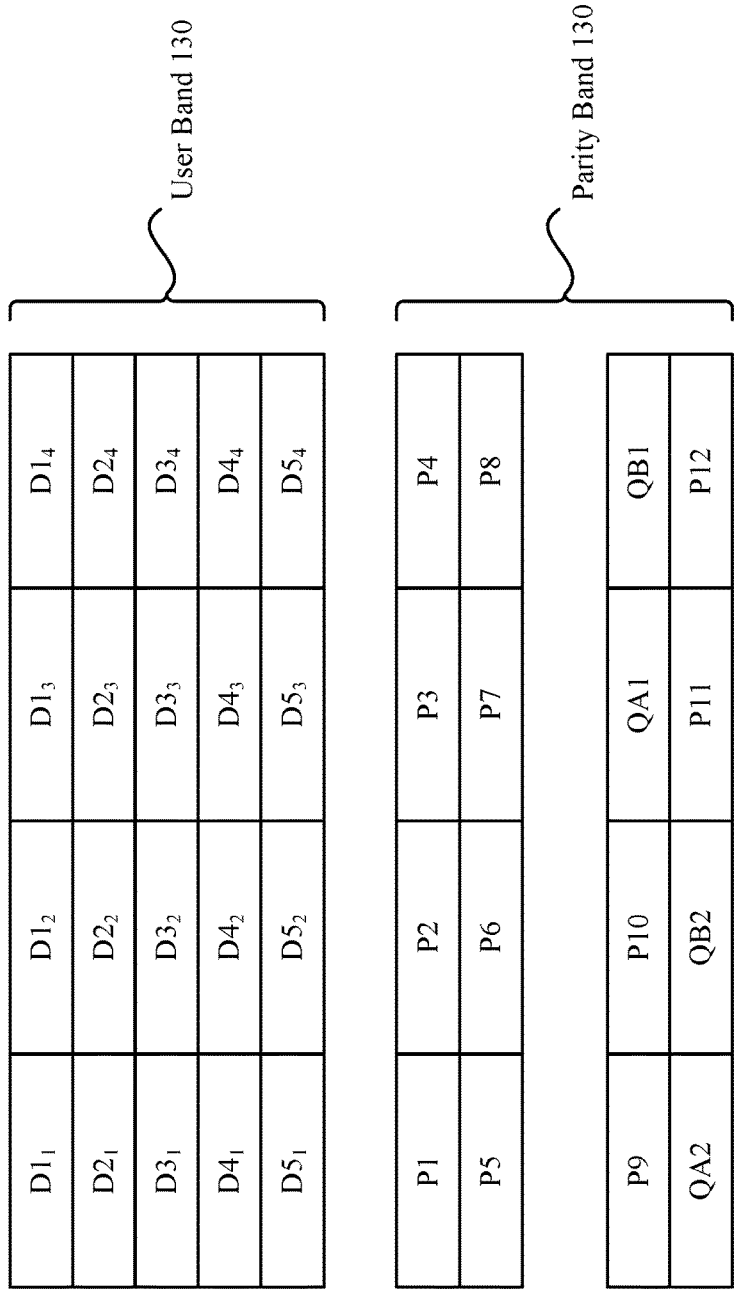

Accordingly, at the conclusion of the tenth step of FIG. 2J, the example scenario can transition to an eleventh step illustrated in FIG. 2K, which represents the outcome of the recovery procedure described in conjunction with FIGS. 2A-2J. In particular, and as shown in FIG. 2K, all of the data pages 136, primary parity pages 136, and secondary parity pages 136 have been effectively recovered, despite the die 132-1 failure. Again, it is noted that these recovered pages are illustrated in their original positions (i.e., within the die 132-1) for the purpose of simplicity, and that these recovered pages will be relocated into functioning dies 132 of the non-volatile memory 118. In any case, the robust recovery procedures described herein can be effectively carried out due to the manner in which the data pages 136/primary parity pages 136/secondary parity pages 136 are distributed throughout the different stripes 134 of the different bands 130.

Figure 2L:
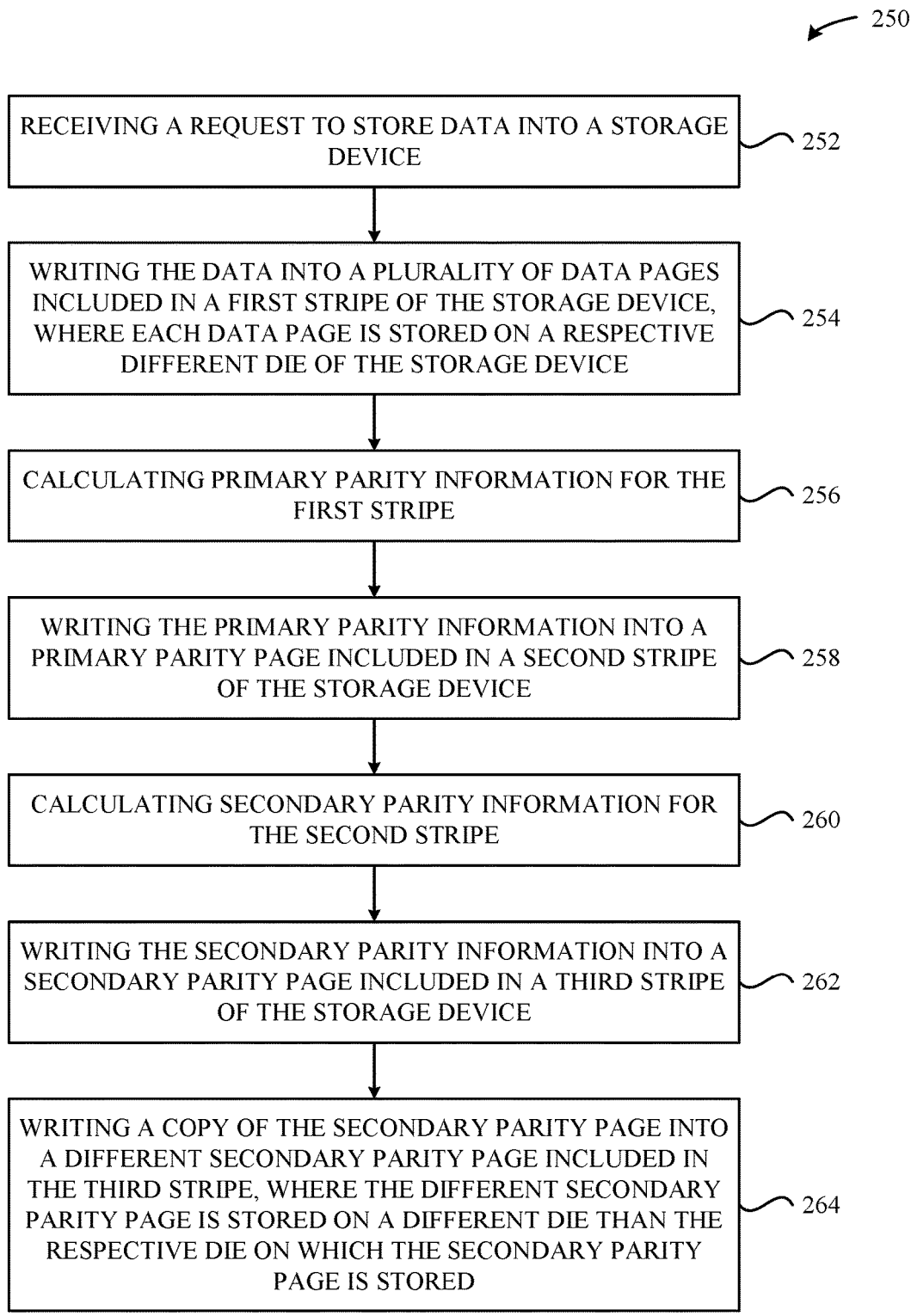
FIG. 2L illustrates a method that involves establishing parity information in accordance with a write request that is received by a storage device, according to some embodiments.

Accordingly, to provide additional context to the data/parity information distribution techniques described herein, FIG. 2L illustrates a method 250 that involves establishing data pages 136/primary parity pages 136/secondary parity pages 136 in accordance with a write request that is received by the storage device 112, according to some embodiments. In particular, and as shown in FIG. 2L, the method 250 begins at step 252, where the controller 114 receives a request to store data into the storage device 112. For example, the request can be issued by an application 110/the OS 108 in conjunction with a user creating a data object (e.g., a file) on the computing device 102. In another example, the request can be issued in conjunction with a user modifying an existing data object.

At step 254, the controller 114 writes the data into a plurality of data pages 136 included in a first stripe 134 of the storage device 112 (i.e., the non-volatile memory 118), where each data page 136 is stored on a respective different die 132 of the storage device 112. In this regard, the first stripe 134 can be included in a first band 130, e.g., the user band 130 described above in conjunction with FIGS. 2A-2K. At step 256, the controller 114 calculates primary parity information for the first stripe 134. This can involve, for example, calculating the exclusive disjunction (XOR) of the data pages 136 included in the first stripe 134. It is noted that the execution of step 256 can be delayed according to a variety of factors to help improve the overall efficiency of the techniques set forth herein. For example, step 256 can be executed in response to identifying that a threshold number of data pages 136 are written into the first stripe such that the first stripe is completely written. In any case, at step 258, the controller 114 writes the primary parity information into a primary parity page 136 included in a second stripe 134 of the storage device 112. However, it is noted that the primary parity information can be written into two or more primary parity pages 136 without departing from the scope of this disclosure. In any case, the second stripe 134 can be included in a second band 130, e.g., the parity band 130 described above in conjunction with FIGS. 2A-2K.

At step 260, the controller 114 calculates secondary parity information for the second stripe 134. This can involve, for example, calculating the exclusive disjunction (XOR) of the primary parity page 136 included in the second stripe 134, as well as any other primary parity pages 136 included in the second stripe 134. Again, it is noted that the parity information calculation techniques described herein are not limited to exclusive disjunction (XOR) implementations, and that any approach can be used to calculate the parity information. Additionally, it is noted that the execution of step 262 can be delayed according to a variety of factors to help improve the overall efficiency of the techniques set forth herein. For example, step 262 be executed in response to identifying that a threshold number of primary parity pages 136 are written into the second stripe such that the second stripe is completely written.

In any case, at step 262, the controller 114 writes the secondary parity information into a secondary parity page 136 included in a third stripe 134 of the storage device 112. However, it is noted that the secondary parity information can be written into two or more secondary parity pages 136 without departing from the scope of this disclosure. In any case, the third stripe 134 can also be included within the second band 130, e.g., the parity band 130 described above in conjunction with FIGS. 2A-2K.

Next, at step 264, the controller 114 writes a copy of the secondary parity page 136 into a different secondary parity page 136 included in the third stripe 134, where the different secondary parity page 136 is stored on a different die 132 than the respective die 132 on which the secondary parity page 136 is stored. Notably, scenarios that involve utilizing multiple secondary parity pages 136 to represent the secondary parity information would involve establishing multiple corresponding copies as well. In any case, at the conclusion of step 264, various data pages 136/primary parity pages 136/secondary parity pages 136 are written across different bands 130/dies 132 of the non-volatile memory 118 in response to the write request that is received at step 252.

Accordingly, FIGS. 2A-2L set forth a detailed description of the manner in which data and its corresponding parity information can be distributed within the non-volatile memory 118 to enable robust recovery scenarios to be carried out when necessary (e.g., when a failure of a die 132 occurs). It is additionally noted that the techniques described herein remain effective even as the non-volatile memory 118 ages over time/usage, where different portions of the non-volatile memory 118 become unusable (e.g., failed dies 132, bad blocks within the dies 132, etc.). In particular, "step-over" conditions can exist in which different data pages 136/primary parity pages 136/secondary parity pages 136 are not contiguously written within their respective stripes 134/bands 130. However, the techniques described herein are capable of handling such step-over conditions, such that the robust recovery procedures can continue to be carried out. To illustrated this notion, FIGS. 3A-3E provide another example scenario in which similar recovery techniques can be applied even when different data pages 136/primary parity pages 136/secondary parity pages 136 are disparately written across dies 132 of the non-volatile memory 118 due to step-over conditions.

Figure 3A:
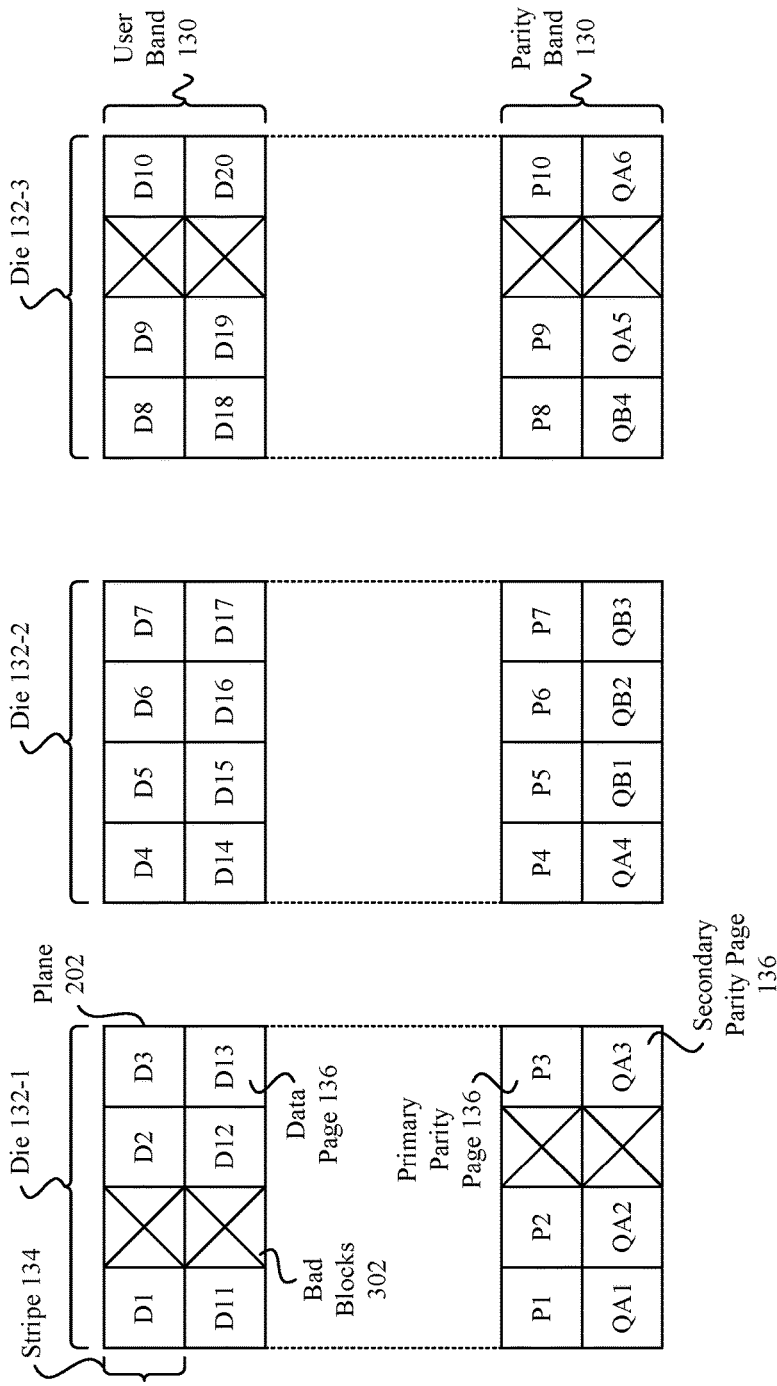
Figure 3B:
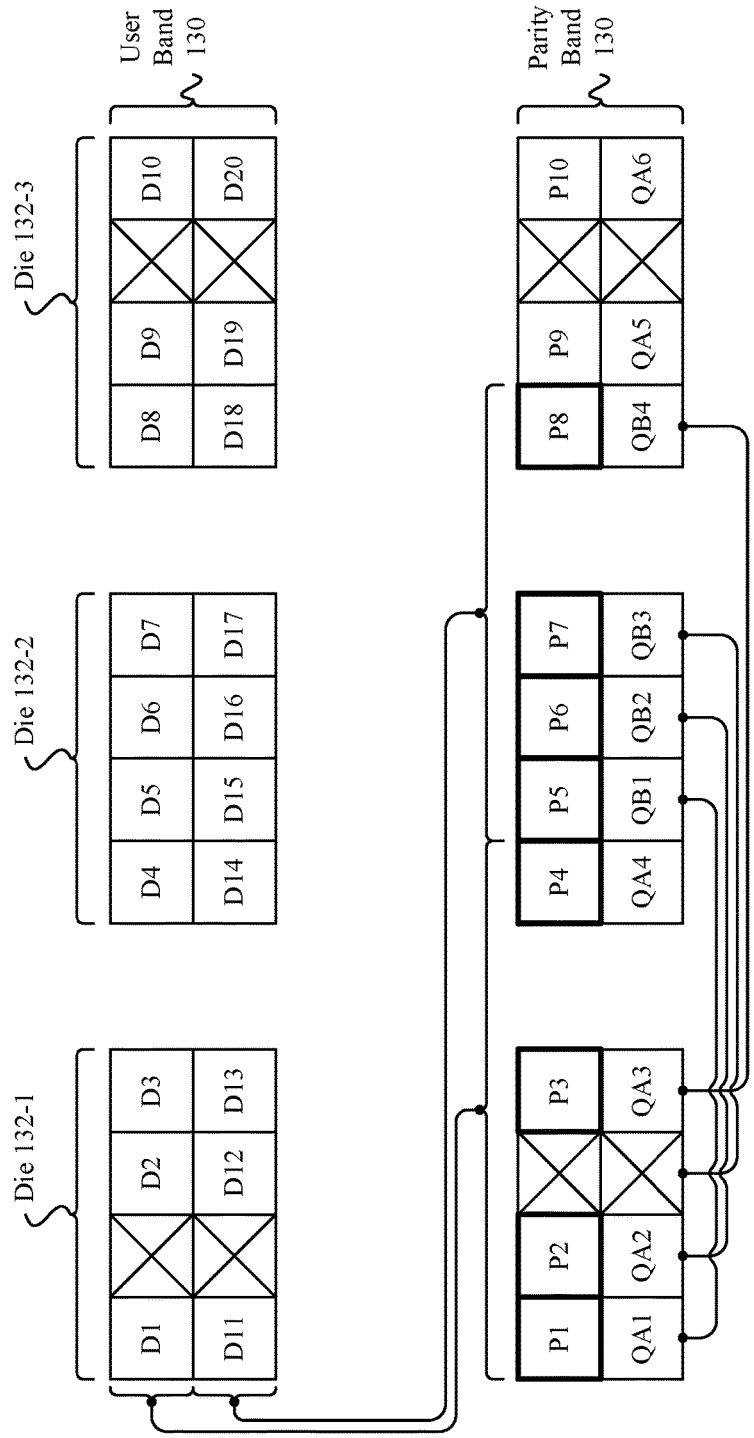
Figure 3C:
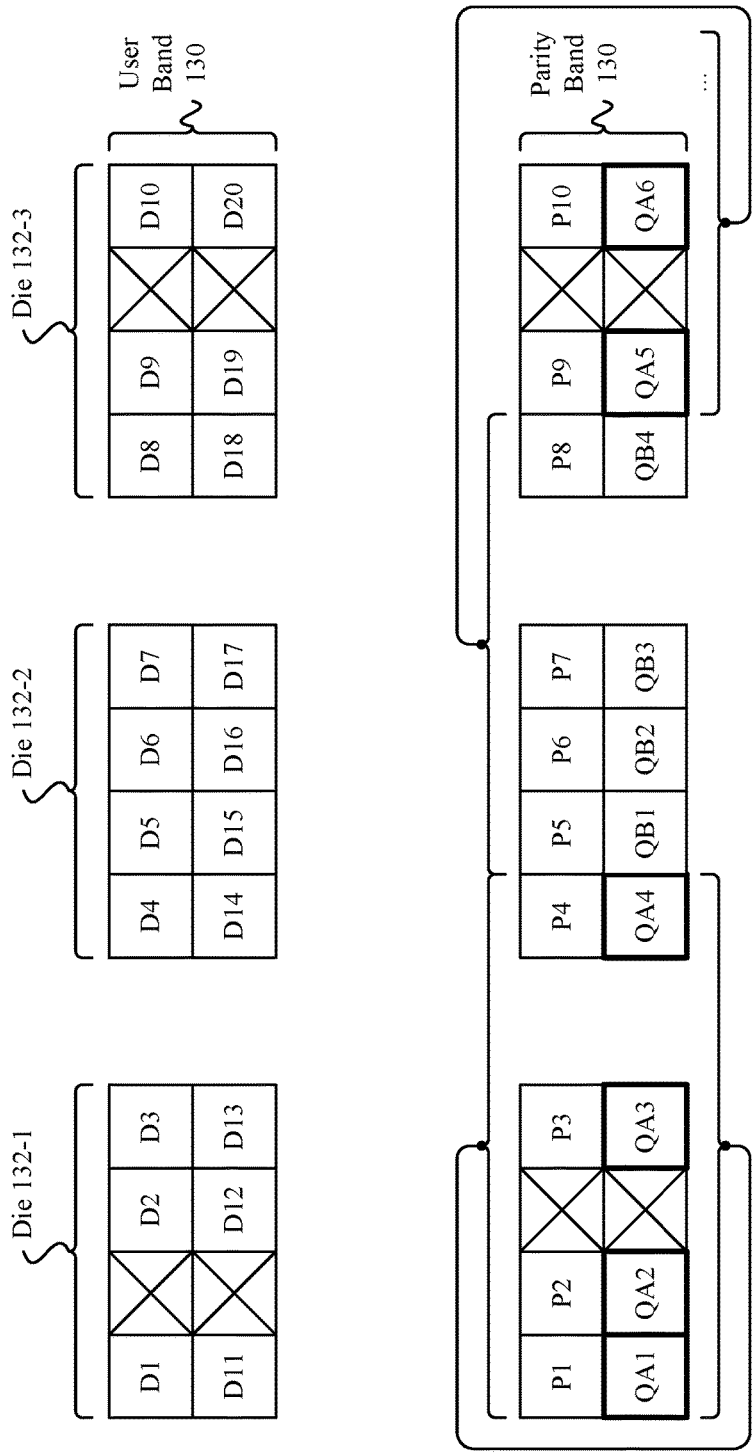
Figure 3D:
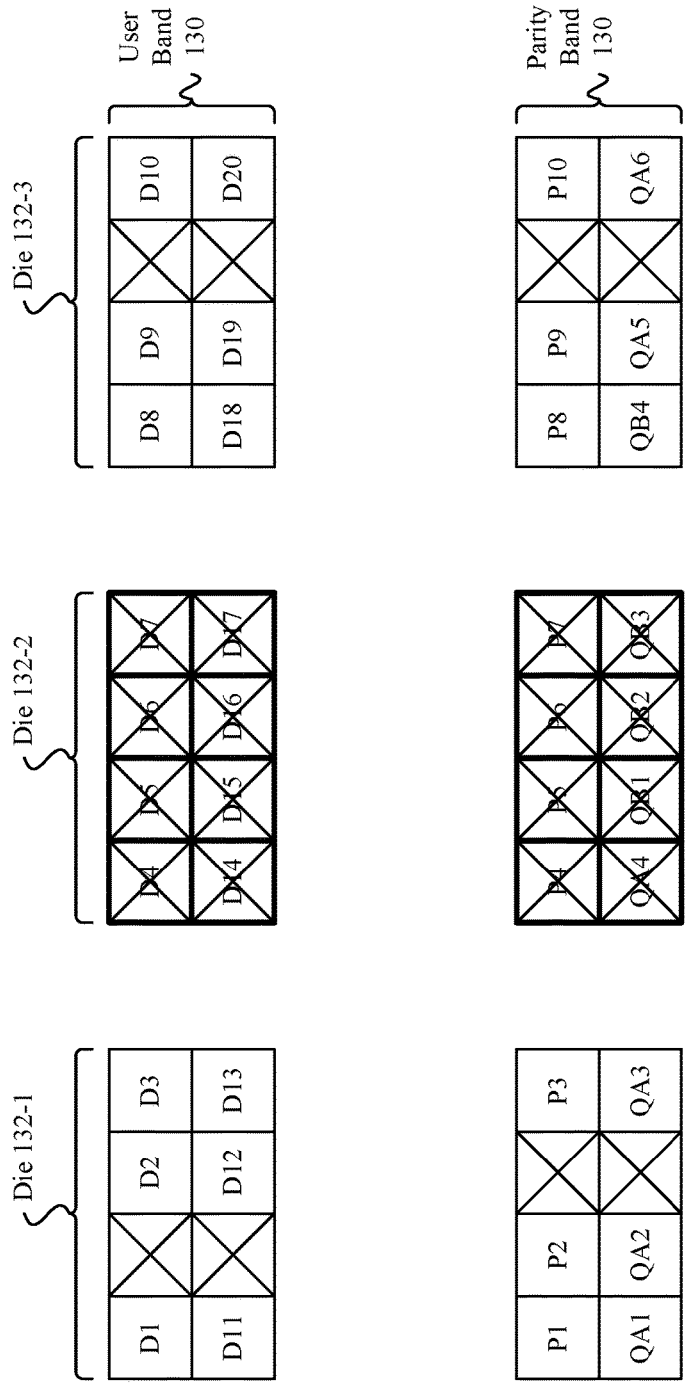

In particular, FIGS. 3A-3C collectively illustrate a first step that provides an example architectural layout of the non-volatile memory 118 to provide foundational support for the techniques that are described in conjunction with FIGS. 3D-3E. In particular, and as shown in FIG. 3A, the non-volatile memory 118 includes three dies 132: a die 132-1, a die 132-2, and a die 132-3. Moreover, the non-volatile memory 118 is separated into two different bands 130: a user band 130 and a parity band 130, which each respectively include two stripes 134. For example, each stripe 134 of the user band 130 can encompass twelve (12) different data pages 136. It is noted that within the context of FIGS. 3A-3E, each data page 136 represents a particular plane 202 (as introduced above in conjunction with FIG. 2A). In this regard, FIGS. 3A-3E represent a lower-level view of the dies 132 (in comparison to FIGS. 2A-2K) in order to provide a more thorough understanding of the techniques set forth herein.

In any case, as shown in FIG. 3A, each stripe 134 of the parity band 130 can encompass twelve (12) different primary/secondary parity pages 136. However, as shown in FIG. 3A, different areas of the non-volatile memory 118 can include bad blocks 302 that prevent pages 136 from being stored. In this regard, the various pages 136 illustrated in FIG. 3A are not contiguously written within the stripes 134, and instead are disparately written in accordance with the various breaks that occur due to the bad blocks 302.

For example, as a consequence of two instances of bad blocks 302, the first stripe 134 of the user band 130 includes ten (10) data pages 136 instead of the twelve (12) data pages 136 that the first stripe 134 of the user band 130 is designed to encompass. Moreover, as a consequence of the two instances of bad blocks 302, the second stripe 134 of the user band 130 includes ten (10) data pages 136 instead of the twelve (12) data pages 136 that the first stripe 134 of the user band 130 is designed to encompass. Additionally, as a consequence of the two instances of bad blocks 302, the first stripe 134 of the parity band 130 includes ten (10) primary parity pages 136 instead of the twelve (12) primary parity pages 136 that the first stripe 134 of the parity band 130 is designed to encompass. Moreover, as a consequence of the two instances of bad blocks 302, the second stripe 134 of the parity band 130 includes ten (10) secondary parity pages 136 instead of the twelve (12) secondary parity pages 136 that the second stripe 134 of the parity band 130 is designed to encompass. It is noted that the bad blocks 302—as well as the distributions of data pages 136/primary parity pages 136/secondary parity pages 136—illustrated in FIG. 3A is merely exemplary, and that the techniques can account for any distribution without departing from the scope of this disclosure.

In any case, FIG. 3B extends the example architectural layout described above in conjunction with FIG. 3A. In particular, FIG. 3B illustrates relationships between the primary parity pages 136 and the data pages 136, according to some embodiments. For example, as shown in FIG. 3A, the primary parity pages 136 (P1, P2, P3, and P4) correspond to the data pages 136 (D1, D2, D3, D4, D5, D6, D7, D8, D9, and D10) included in the first stripe 134 of the user band 130. In particular, the primary parity page 136 "P1" corresponds to the data pages 136 (D1, D4, and D8), the primary parity page 136 "P2" corresponds to the data pages 136 (D5 and D9), the primary parity page 136 "P3" corresponds to the data pages 136 (D2 and D6), and the primary parity page 136 "P4" corresponds to the data pages 136 (D3, D7, and D10). Similarly, the primary parity pages 136 (P5, P6, P7, and P8) correspond to the data pages 136 (D11, D12, D13, D14, D15, D16, D17, D18, D19, and D20) included in the second stripe 134 of the user band 130. In particular, the primary parity page 136 "P5" corresponds to the data pages 136 (D11, D14, and D18), the primary parity page 136 "P6" corresponds to the data pages 136 (D15 and D19), the primary parity page 136 "P7" corresponds to the data pages 136 (D12 and D16), and the primary parity page 136 "P8" corresponds to the data pages 136 (D13, D17, and D20). It is noted that in the interest of simplifying this disclosure, details surrounding the primary parity pages 136 "P9" and "P10" are omitted.

Additionally, as shown in FIGS. 3B-3C, the parity band 130 includes secondary parity pages 136 (QA1, QA2, QA3, and QA4) that correspond to the primary parity pages 136, where each secondary parity page 136 has a counterpart (i.e., copy) secondary parity page 136 (QB1, QB2, QB3, and QB4). In particular, the secondary parity page 136 "QA1" has a counterpart secondary parity page 136 "QB1", where each corresponds to the primary parity pages 136 (P1, P4, and P8). Similarly, the secondary parity page 136 "QA2" has a counterpart secondary parity page 136 "QB2", where each corresponds to the primary parity pages 136 (P2, P5, and P9). Similarly, the secondary parity page 136 "QA3" has a counterpart secondary parity page 136 "QB3", where each corresponds to the primary parity page 136 (P6). Moreover, the secondary parity page 136 "QA4" has a counterpart secondary parity page 136 "QB4", where each corresponds to the primary parity pages 136 (P3, P7, P10). It is noted that in the interest of simplifying this disclosure, details surrounding the secondary parity pages 136 "QA5" and "QA6" are omitted.

Accordingly, FIGS. 3A-3C collectively illustrate conceptual diagrams of an example architectural layout of the non-volatile memory 118 to provide foundational support for a failure scenario of a die 132 when step-over conditions are present, which will now be described in conjunction with FIG. 3D. In particular, and as shown in FIG. 3D, a second step of the example scenario involves a failure of the die 132-2, such that the data pages 136 (D4, D5, D6, D7, D14, D15, D16, and D17) are lost. Moreover, the failure of the die 132-2 results in the loss of the primary parity pages 136 (P4, P5, P6, and P7), as well as the loss of the secondary parity pages 136 (QA4, QB1, QB2, QB3). However, the techniques described herein beneficially enable a recovery procedure to take place in which the foregoing pages 136 can be effectively recovered, which will now be described below in conjunction with FIG. 3E.

As shown in FIG. 3E, a third step of the example scenario involves a recovery of the various pages 136 (illustrated in FIG. 3D) that are lost as a result of the failure of the die 132-2. In particular, the recovery table illustrated in FIG. 3E provides a breakdown of the manner in which the various pages 136 can be effectively recovered. For example, the data page 136 "D4" can be recovered using the data page 136 "D1", the data page 136 "D8", and the primary parity page 136 "P1", using the exclusive disjunction (XOR) techniques described herein (assuming exclusive disjunction (XOR) is used to establish the primary parity page 136 "P1"). In another example, the data page 136 "D7" can be recovered using the data page 136 "D3", the data page 136 "D10", and the primary parity page 136 "P4". However, as described above in conjunction with FIG. 3D, the primary parity page 136 "P4" is no longer accessible due to the loss of the die 132-2. Fortunately, the primary parity page 136 "P4" can be recovered using the primary parity page 136 "P1", the primary parity page 136 "P8", and the secondary parity page 136 "QA1", as these pages 136 remain accessible despite the failure of the die 132-2. In any case, and as shown by way of the recovery table, each of the lost pages 136 can be effectively recovered, thereby improving recovery options in situations where important might otherwise be permanently lost. Again, it is noted that the various recovered pages 136 are illustrated within their original positions for the purpose of simplicity, and that those having skill in the art will appreciate that these recovered pages 136 will be stored other locations (as the die 132-2 is not functional).

Accordingly, FIGS. 3A-3E set forth a detailed description of the manner in which the techniques described herein can remain effective even when different portions of the non-volatile memory 118 become unusable (e.g., failed dies 132, bad blocks within the dies 132, etc.) and result in step-over conditions. It is additionally noted that the techniques described herein can be adjusted to account for partial writes that occur within a stripe 134 of a band 130. For example, a common scenario can involve the controller 114 receiving a request to write a data object into the non-volatile memory 118. As previously described herein, receipt of this request can cause the controller 114 to begin writing respective portions of the data object into different data pages 136 of at least one stripe 134 included in a user band 130. However, this process can be interrupted for a variety of reasons (e.g., a flush event, a shutdown, etc.), such that an incomplete stripe 134 exists within the user band 130. When such an interruption occurs, a log file can store the requisite information that enables the controller 114 to effectively resume and complete the write operation (e.g., when the computing device 102 comes back online).

Importantly, various drawbacks can be associated with generating/writing parity information that corresponds to an incomplete stripe 134. For example, if primary parity information for the incomplete stripe 134 is generated/written into the non-volatile memory 118 (in accordance with the techniques described herein), secondary parity information will also be generated (in accordance with the techniques described herein). Continuing with this example, when the write request resumes, and the incomplete stripe 134 is ultimately written to/completed, the same primary parity information/secondary parity information will need to be recalculated/rewritten into the non-volatile memory 118. Those having ordinary skill in the art will appreciate that this approach can lead to degradation of the overall performance and lifespan of the non-volatile memory 118 due to the excessive I/O operations that are required to carry out such an approach. For this reason, it is desirable to manage the parity information for partial stripes 134 in a particular manner to help reduce the overall impact that such scenarios make on the non-volatile memory 118.

Figure 4A:
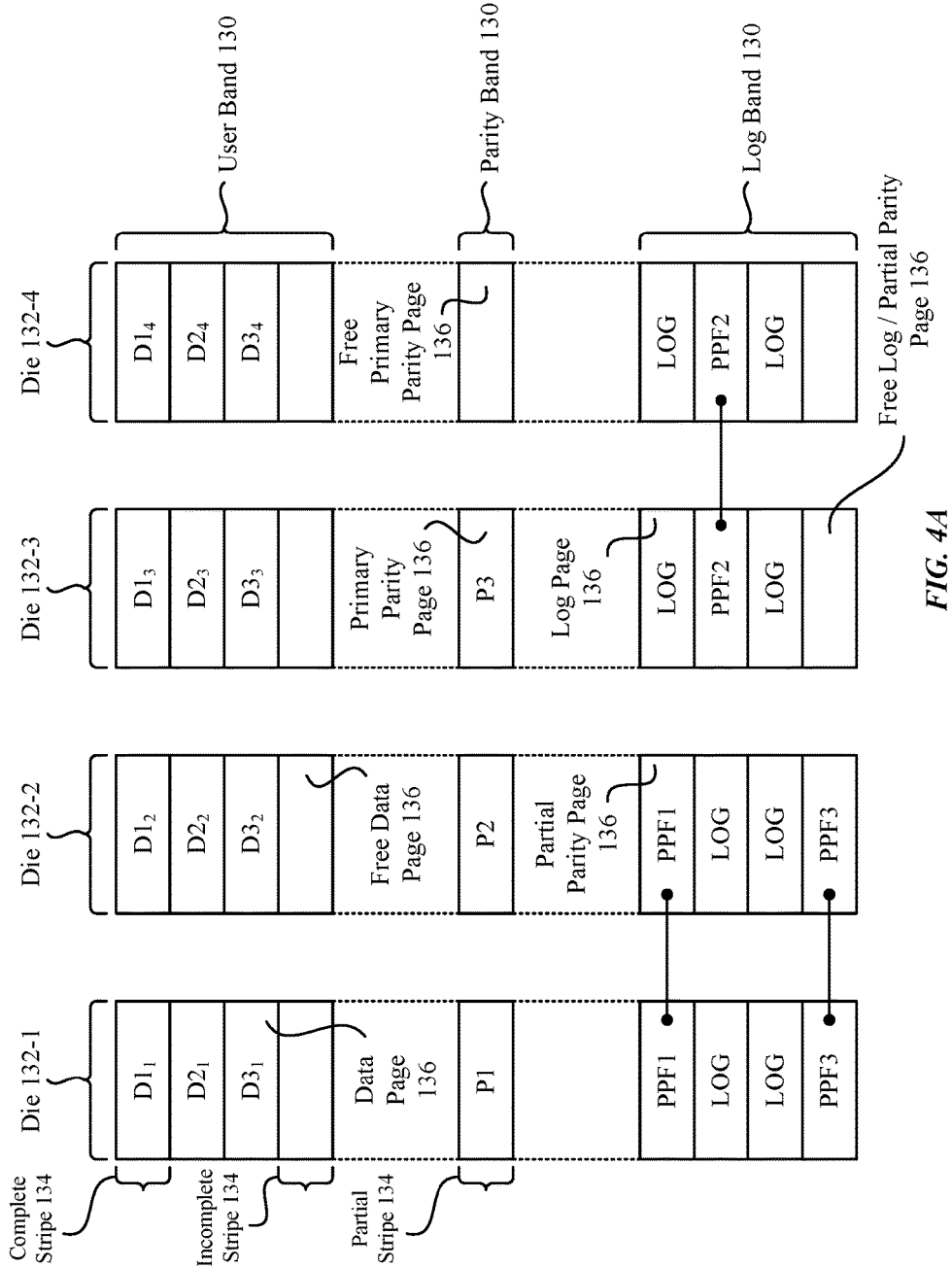
FIGS. 4A-4D illustrate conceptual diagrams of an example scenario in which a write request causes a partial stripe to be established within a user band, according to some embodiments.

Accordingly, FIGS. 4A-4D illustrate conceptual diagrams of an example scenario in which a write request causes a partial stripe 134 to be established within a user band 130, according to some embodiments. As shown in FIG. 4A, a first step provides an example architectural layout of the non-volatile memory 118 to provide foundational support for the various techniques that are described in conjunction with FIGS. 4B-4D. In particular, the non-volatile memory 118 includes four dies 132: a die 132-1, a die 132-2, a die 132-3, and a die 132-4. Moreover, the non-volatile memory 118 is separated into three different bands 130: a user band 130, a parity band 130, and a log band 130. In the example scenario illustrated in FIG. 4A, the user band 130 includes three complete stripes 134, where each complete stripe 134 includes four different data pages 136 (e.g., $DN_1$, $DN_2$, $DN_3$, and $DN_4$, where N is the stripe number, and $1 \le N \le 3$). Additionally, the user band 130 includes an incomplete stripe 134 that includes four (4) free data pages 136, where the incomplete stripe 134 can function as a starting point into which new data can be written.

As also shown in FIG. 4A, the parity band 130 includes a partial stripe 134 that includes the primary parity pages 136 (P1, P2, and P3), as well as a free primary parity page 136. As further shown in FIG. 4A, the log band 130 includes three completed stripes 134 and one partial stripe 134. In particular, the completed stripes 134 of the log band 130 include partial parity pages 136 (PPF1, PPF1, PPF2, PPF2, PPF3, and PPF3), as well as log pages 136 (LOG). It is noted that the dual instances of each of the partial parity pages 136 (e.g., PPF1/PPF1) represent the notion that a copy is created for each partial parity page 136 to establish redundancy in a manner similar to the secondary parity page 136/secondary parity page 136 copies described herein. As shown in FIG. 4A, the partial stripe 134 within the log band 130 includes partial parity pages 136 as well as free pages 136 into which log pages 136/partial parity pages 136 can be written.

Figure 4B:
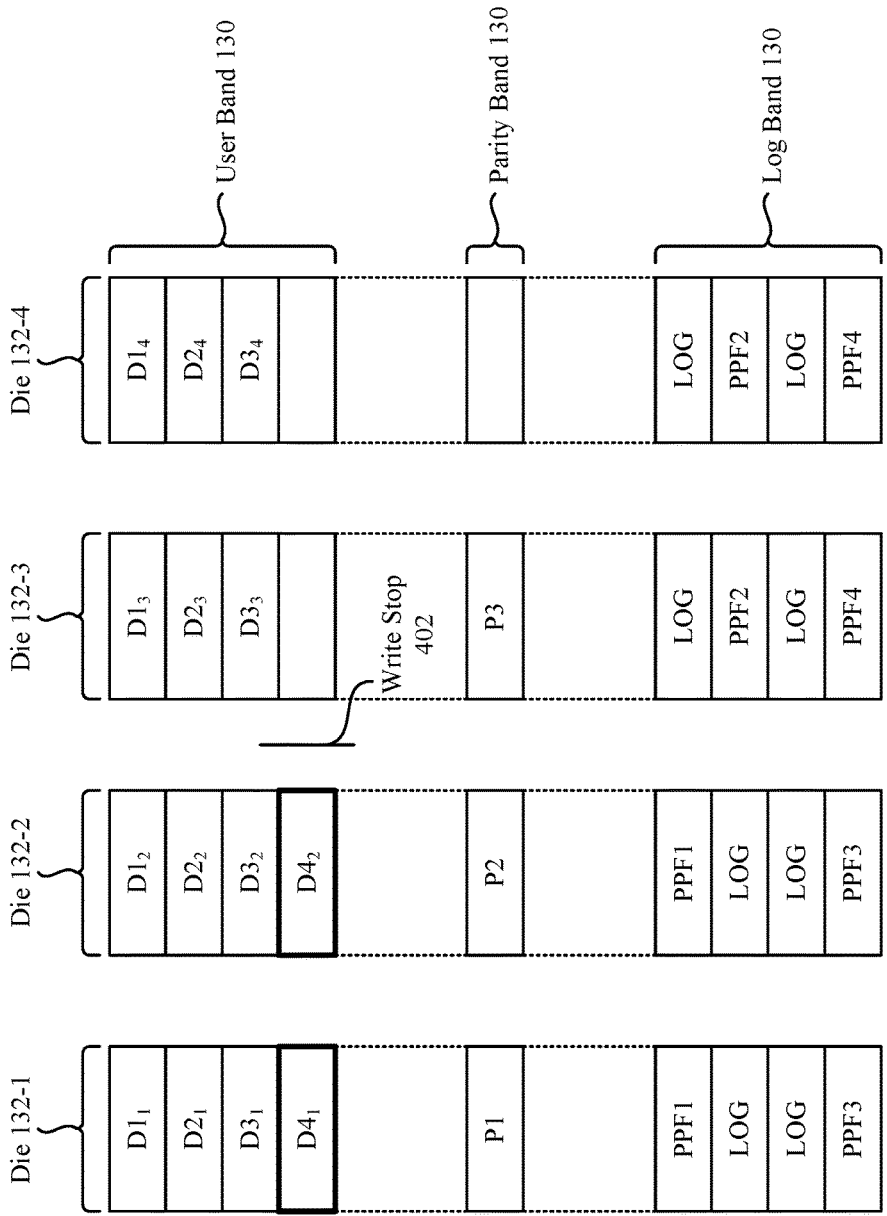

Accordingly, FIG. 4A sets forth an architectural layout of the non-volatile memory 118 to provide foundational support for the partial parity information techniques that will now be described in conjunction with FIGS. 4B-4D. In particular, FIG. 4B illustrates a second step that involves writing data pages 136 ($D4_1$, $D4_2$) until a write stop 402 occurs. Again, such a write stop 402 can take place based on a variety of factors, e.g., an unexpected shutdown of the computing device 102, a flush command, and so on. In any case, the write stop 402 renders the fourth stripe 134 of the user band 130 as a partial stripe 134, as two of the data pages 136 are left free. In response, and in lieu of calculating primary/secondary parity information (e.g., as described herein for complete stripes 134) for the partial stripe 134, partial parity information can instead be calculated and saved within the log band 130.

Figure 4C:
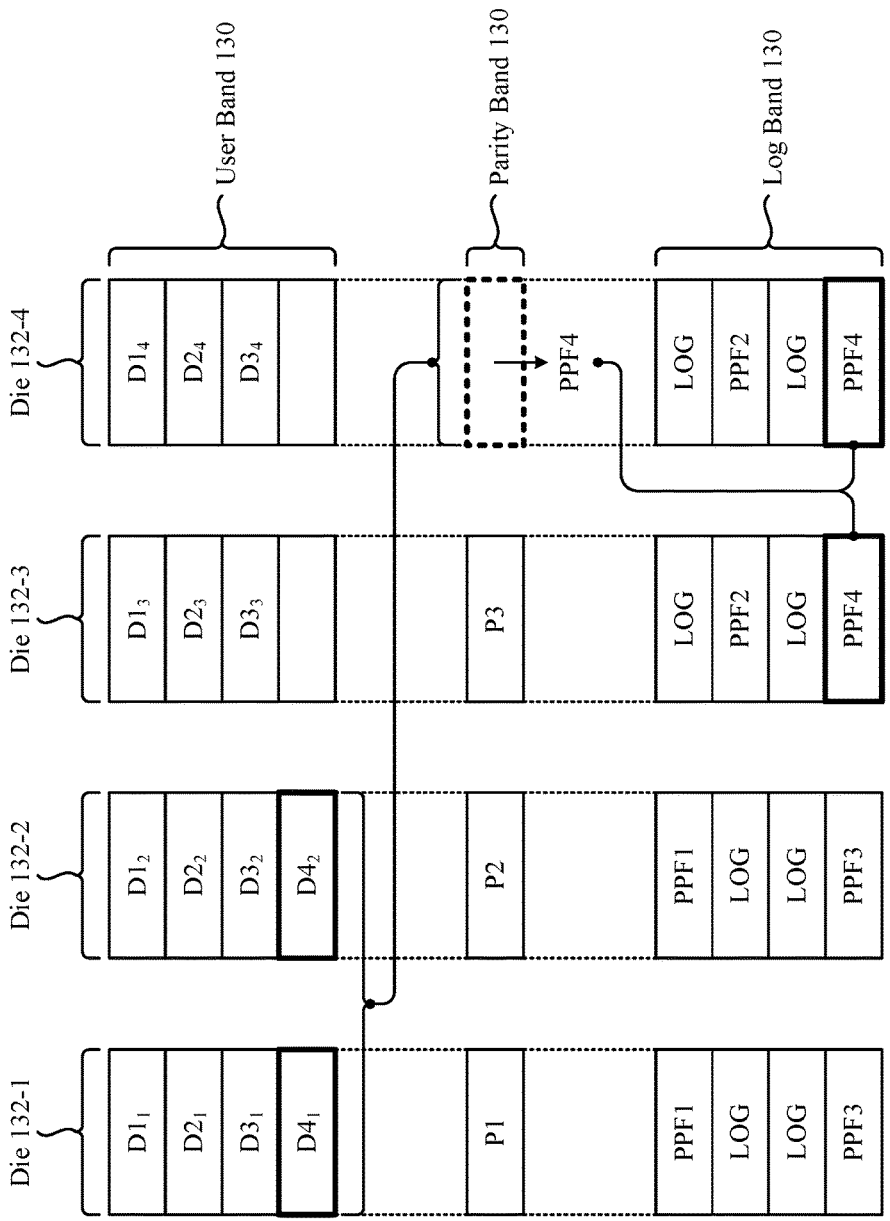

For example, as shown in FIG. 4C, a third step can involve calculating the partial parity information "PPF4" and writing this information into the free pages 136 included in the fourth stripe 134 of the log band 130. In particular, and as shown in FIG. 4C, the third step can involve establishing two instances of the partial parity information "PPF4" using the first and second free pages 136 included in the fourth stripe 134 of the log band 130. In this manner, the redundancy techniques described herein can continue to apply in failure scenarios that would otherwise cause the partially written data to be unrecoverable. For example, if one of the dies 132 were to fail, the partial parity information "PPF4" would remain available by way of the intact/redundant copy, which could then effectively be used to restore the data pages 136 "$D4_1$" and "$D4_2$" if either were lost by way of the die failure.

Figure 4D:
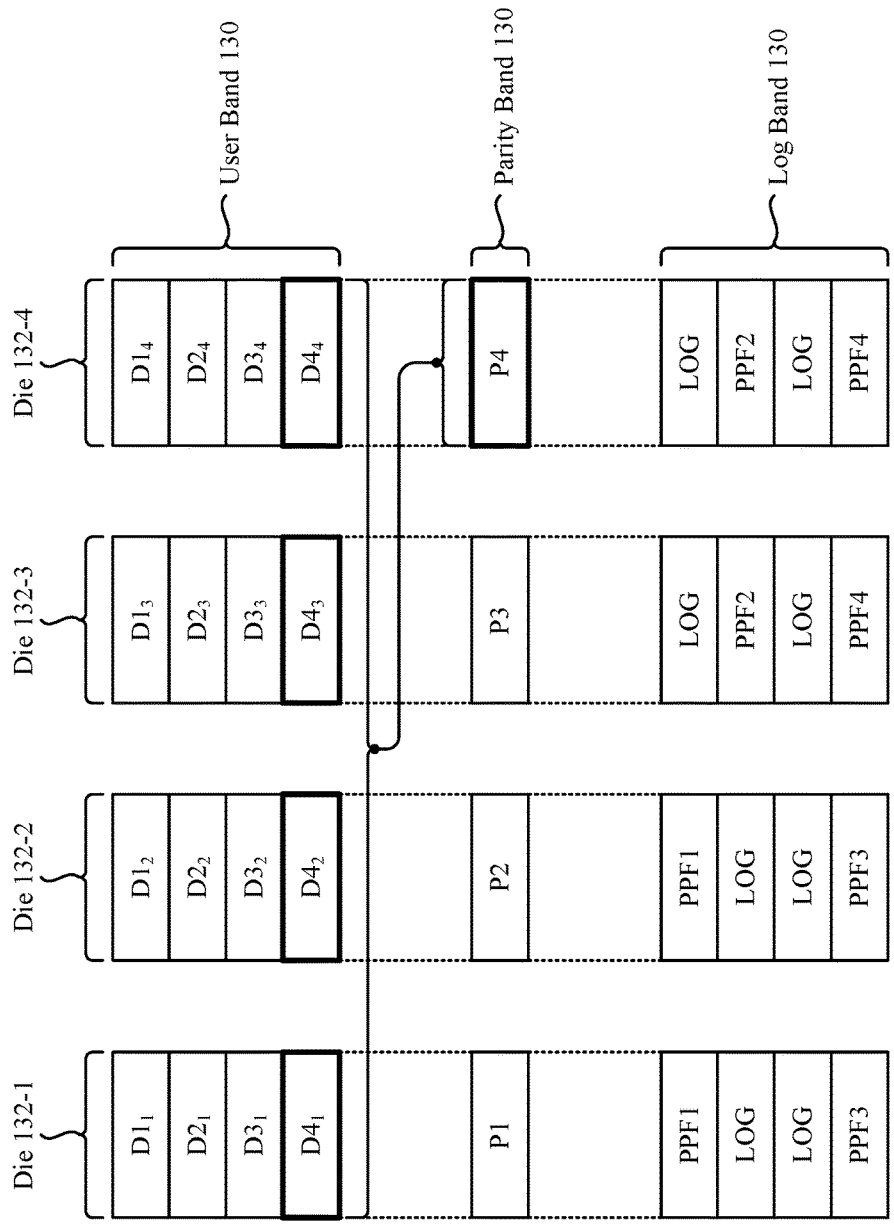

Next, FIG. 4D involves a fourth step in which the partial parity information "PPF4" is invalidated in conjunction with a completion of the write (described above in conjunction with FIG. 4B). For example, the log pages 136 can be processed to identify the appropriate operations to be carried out to complete the write operation, which, as shown in FIG. 4D, can involve writing additional data into data pages 136 "$D4_3$" and "$D4_4$" into the partial stripe 134 of the user band 130, thereby rending the partial stripe 134 a complete stripe 134. In turn, an invalidation of the partial parity information "PPF4" can be issued, as this partial parity information "PPF4" is outdated relative to the updated content of the complete stripe 134 within the user band 130. In turn, a primary parity page 136 "P4" can be calculated for the complete stripe 134, and written into the free primary parity page 136 within the partial stripe 134 of the parity band 130. It is noted that the additional steps that can be taken to establish redundancy for the primary parity page 136—e.g., establishing secondary parity pages 136/secondary parity page 136 copies in accordance with the techniques described herein.

Accordingly, FIGS. 4A-4D set forth an example scenario that involves establishing partial parity information in response to an incomplete write occurring within a stripe 134 of the user band 130, and storing the partial parity information within a log band 130. In this manner, the partial parity information can be utilized, if necessary, to recover the data pages 136 included in the partial stripe 134. In any case, when the write request associated with the partial stripe 134 is completed at a later time (e.g., during a reboot), the controller 114 can generate complete parity information for the complete stripe 134. In turn, the complete parity information can be generated/distributed in accordance with techniques described herein. A more detailed explanation of the partial parity techniques described above in conjunction with FIGS. 4A-4D will now be provided below in conjunction with FIG. 4E.

Figure 4E:
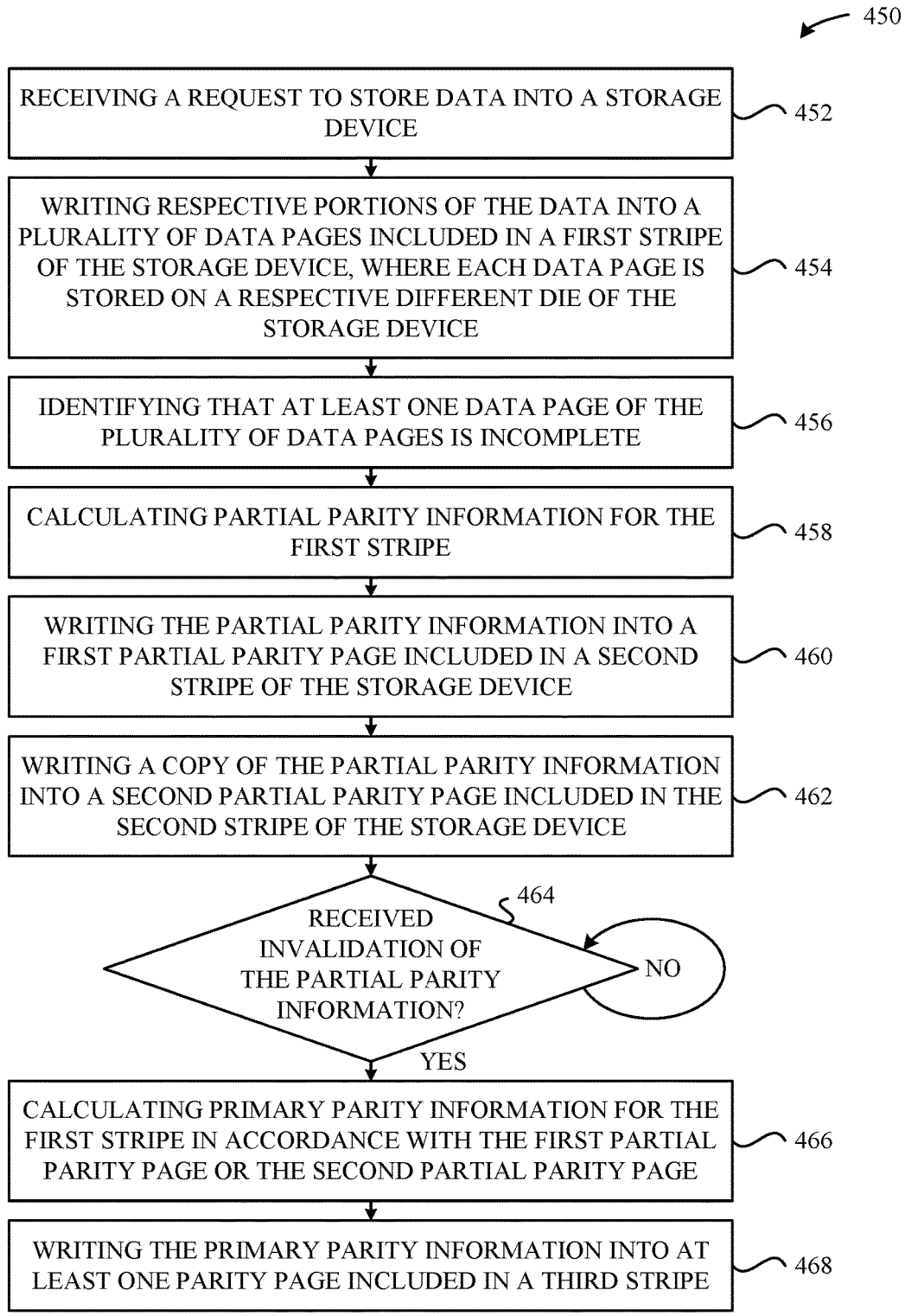
FIG. 4E illustrates a method for establishing partial parity information in accordance with a write request that is received by the storage device but is not fully completed, according to some embodiments.

FIG. 4E illustrates a method 450 for establishing data pages 136/partial parity pages 136 in accordance with a write request that is received by the storage device 112 but is not fully completed, according to some embodiments. As shown in FIG. 4E, the method 450 begins at step 452, where the controller 114 receives a request to store data into the storage device 112 (e.g., as described above in conjunction with FIG. 4B). At step 454, the controller 114 writes respective portions of the data into a plurality of data pages 136 included in a first stripe 134 of the storage device 112—specifically, the non-volatile memory 118 of the storage device 112—where each data page 136 is stored on a respective different die 132 of the non-volatile memory 118 (e.g., as also described above in conjunction with FIG. 4B).

At step 456, the controller 114 identifies that at least one data page 136 of the plurality of data pages 136 is incomplete (e.g., as described above in conjunction with FIG. 4C). At step 458, the controller 114 calculates partial parity information for the first stripe 134 (e.g., as also described above in conjunction with FIG. 4C). At step 460, the controller 114 writes the partial parity information into a first partial parity page 136 included in a second stripe 134 of the storage device 112 (e.g., as also described above in conjunction with FIG. 4C). At step 462, the controller 114 writes a copy of the partial parity information into a second partial parity page 136 included in the second stripe of the storage device 112. In other words, step 462 can involve establishing a copy of the first partial parity page 136 (e.g., as also described above in conjunction with FIG. 4C), where the second partial parity page 136 is stored on a die 132 that is distinct from the die 132 on which the first partial parity page 136. At step 464, the controller 114 determines whether an invalidation of the partial parity information is received (e.g., as described above in conjunction with FIG. 4D). If, at step 464, the controller 114 receives the invalidation of the partial parity information, then the method 450 proceeds to step 466. Otherwise, the controller 114 waits until the invalidation is received, and/or moves on to processing other tasks. At step 466, the controller 114 calculates primary parity information for the first stripe 134 in accordance with the first partial parity page 136 or the second partial parity page 136 (e.g., as described above in conjunction with FIG. 4D). Finally, at step 468, the controller 114 writes the primary parity information into at least one parity page 136 included in a third stripe 134 (e.g., the parity band 130).

It is noted that this disclosure primarily involves the controller 114 carrying out the various techniques described herein for the purpose of unified language and simplification. However, it is noted that other entities can be configured to carry out these techniques without departing from this disclosure. For example, other software components (e.g., the OS 108, applications 110, firmware(s), etc.) executing on the computing device 102 can be configured to carry out all or a portion of the techniques described herein without departing from the scope of this disclosure. Moreover, other hardware components included in the computing device 102 can be configured to carry out all or a portion of the techniques described herein without departing from the scope of this disclosure. Further, all or a portion of the techniques described herein can be offloaded to another computing device without departing from the scope of this disclosure.

Figure 5:
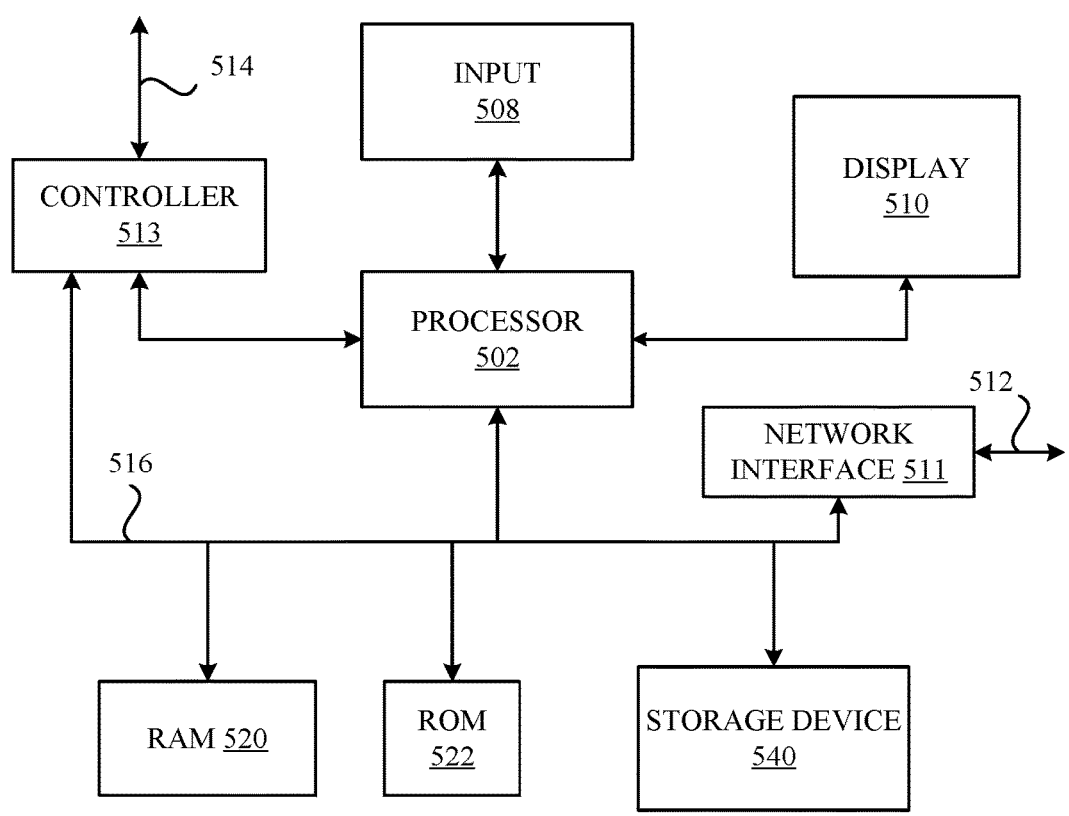
FIG. 5 illustrates a detailed view of a computing device that can be used to implement the various components described herein, according to some embodiments.

FIG. 5 illustrates a detailed view of a computing device 500 that can represent the computing devices of FIG. 1 used to implement the various techniques described herein, according to some embodiments. For example, the detailed view illustrates various components that can be included in the computing device 102 described in conjunction with FIG. 1. As shown in FIG. 5, the computing device 500 can include a processor 502 that represents a microprocessor or controller for controlling the overall operation of the computing device 500. The computing device 500 can also include a user input device 508 that allows a user of the computing device 500 to interact with the computing device 500. For example, the user input device 508 can take a variety of forms, such as a button, keypad, dial, touch screen, audio input interface, visual/image capture input interface, input in the form of sensor data, and so on. Still further, the computing device 500 can include a display 510 that can be controlled by the processor 502 (e.g., via a graphics component) to display information to the user. A data bus 516 can facilitate data transfer between at least a storage device 540, the processor 502, and a controller 513. The controller 513 can be used to interface with and control different equipment through an equipment control bus 514. The computing device 500 can also include a network/bus interface 511 that couples to a data link 512. In the case of a wireless connection, the network/bus interface 511 can include a wireless transceiver.

As noted above, the computing device 500 also includes the storage device 540, which can comprise a single disk or a collection of disks (e.g., hard drives). In some embodiments, storage device 540 can include flash memory, semiconductor (solid state) memory or the like. The computing device 500 can also include a Random-Access Memory (RAM) 520 and a Read-Only Memory (ROM) 522. The ROM 522 can store programs, utilities or processes to be executed in a non-volatile manner. The RAM 520 can provide volatile data storage, and stores instructions related to the operation of applications executing on the computing device 500.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for managing parity information for data stored on a storage device, the method comprising, at a computing device that has access to the storage device:
   receiving a request to store data onto the storage device;
   writing respective portions of the data into a plurality of data pages included in a first stripe of the storage device, wherein each data page of the plurality of data pages is disposed on a different die of the storage device;
   calculating primary parity information for the first stripe;
   writing the primary parity information into a primary parity page included in a second stripe of the storage device;
   calculating secondary parity information for the second stripe;
   writing the secondary parity information into a secondary parity page included in a third stripe of the storage device; and
   writing a copy of the secondary parity page into a different secondary parity page included in the third stripe, wherein the different secondary parity page is disposed on a different die than the die on which the secondary parity page is disposed.

2. The method of claim 1, wherein the second stripe includes a plurality of primary parity pages in which the primary parity page is included, and each primary parity page of the plurality of primary parity pages is disposed on a respective different die of the storage device.

3. The method of claim 1, wherein the third stripe includes a plurality of secondary parity pages in which the secondary parity page is included, and each secondary parity page of the plurality of secondary parity pages is disposed on a respective different die of the storage device.

4. The method of claim 3, wherein the different secondary parity page is included in the plurality of secondary parity pages.

5. The method of claim 3, wherein the third stripe further includes at least one primary parity page that is disposed among the plurality of secondary parity pages.

6. The method of claim 1, wherein:
   (i) the first stripe is logically disposed within a first band, and
   (ii) the second and third stripes are logically disposed in a second band that is distinct from the first band.

7. The method of claim 1, wherein writing the data into the plurality of data pages included in the first stripe comprises:
   attempting to write a respective portion of the data into a particular data page of the plurality of data pages;
   identifying that an underlying portion of a first die to which the particular data page corresponds is inaccessible;
   identifying a next data page having a corresponding underlying portion of a second die that is accessible; and
   writing the respective portion of the data into the next data page.

8. The method of claim 7, wherein the next data page is included in a subsequent stripe that is distinct from the first stripe.

9. At least one non-transitory computer readable storage medium configured to store instructions that, when executed by at least one processor included in a computing device, cause the computing device to manage parity information for data stored on a storage device that is accessible to the computing device, by carrying out steps that include:
   receiving a request to store data onto the storage device;
   writing respective portions of the data into a plurality of data pages included in a first stripe of the storage device, wherein each data page of the plurality of data pages is disposed on a different die of the storage device;
   calculating primary parity information for the first stripe;
   writing the primary parity information into a primary parity page included in a second stripe of the storage device;
   calculating secondary parity information for the second stripe;
   writing the secondary parity information into a secondary parity page included in a third stripe of the storage device; and
   writing a copy of the secondary parity page into a different secondary parity page included in the third stripe, wherein the different secondary parity page is disposed on a different die than the die on which the secondary parity page is disposed.

10. The at least one non-transitory computer readable storage medium of claim 9, wherein the second stripe includes a plurality of primary parity pages in which the primary parity page is included, and each primary parity page of the plurality of primary parity pages is disposed on a respective different die of the storage device.

11. The at least one non-transitory computer readable storage medium of claim 9, wherein the third stripe includes a plurality of secondary parity pages in which the secondary parity page is included, and each secondary parity page of the plurality of secondary parity pages is disposed on a respective different die of the storage device.

12. The at least one non-transitory computer readable storage medium of claim 11, wherein the different secondary parity page is included in the plurality of secondary parity pages.

13. The at least one non-transitory computer readable storage medium of claim 11, wherein the third stripe further includes at least one primary parity page that is disposed among the plurality of secondary parity pages.

14. The at least one non-transitory computer readable storage medium of claim 9, wherein:
   (i) the first stripe is logically disposed within a first band, and (ii) the second and third stripes are logically disposed in a second band that is distinct from the first band.

15. The at least one non-transitory computer readable storage medium of claim 9, wherein writing the data into the plurality of data pages included in the first stripe comprises:
   attempting to write a respective portion of the data into a particular data page of the plurality of data pages;
   identifying that an underlying portion of a first die to which the particular data page corresponds is inaccessible;
   identifying a next data page having a corresponding underlying portion of a second die that is accessible; and
   writing the respective portion of the data into the next data page.

16. The at least one non-transitory computer readable storage medium of claim 15, wherein the next data page is included in a subsequent stripe that is distinct from the first stripe.

17. A computing device configured to manage partial parity information for data stored on a storage device that is accessible to the computing device, the computing device comprising:
   at least one processor; and
   at least one memory storing instructions that, when executed by the at least one processor, cause the computing device to:
      receive a request to store data onto the storage device;
      write respective portions of the data into a plurality of data pages included in a first stripe of the storage device, wherein each data page of the plurality of data pages is disposed on a different die of the storage device;
      identify that the first stripe is incompletely written;
      calculate partial parity information for the first stripe;
      write the partial parity information into a first partial parity page included in a second stripe of the storage device; and
      write a copy of the partial parity information into a second partial parity page included in the second stripe of the storage device.

18. The computing device of claim 17, wherein the first partial parity page is disposed on a first die of the storage device, and the second partial parity page is disposed on a second die of the storage device.

19. The computing device of claim 17, wherein the second stripe includes at least one log page.

20. The computing device of claim 17, wherein the at least one processor further causes the computing device to:
   receive an indication of an invalidation of the partial parity information;
   calculate primary parity information for the first stripe in accordance with the first partial parity page or the second partial parity page; and
   write the primary parity information into at least one parity page included in a third stripe.

* * * * *